US006188950B1

United States Patent
Tsutsumi et al.

(10) Patent No.: US 6,188,950 B1
(45) Date of Patent: Feb. 13, 2001

(54) SYSTEM AND METHOD FOR CONTROLLING INTER-VEHICLE DISTANCE TO PRECEDING VEHICLE FOR AUTOMOTIVE VEHICLE EQUIPPED WITH THE SYSTEM AND METHOD

(75) Inventors: Junji Tsutsumi; Akira Higashimata, both of Kanagawa (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/179,417

(22) Filed: Oct. 27, 1998

(30) Foreign Application Priority Data

Oct. 27, 1997 (JP) .................................................. 9-294245
Nov. 21, 1997 (JP) .................................................. 9-321404

(51) Int. Cl.[7] .............................. G06F 7/00; G05D 1/00
(52) U.S. Cl. .............................. 701/96; 701/93; 701/95; 701/300; 342/70; 342/71; 340/901; 340/902; 340/903; 180/170
(58) Field of Search .................... 701/93, 96, 300, 701/301, 95; 342/70, 71, 72, 47, 454, 455, 458, 456, 104, 106, 107, 109, 114, 118; 340/901, 903, 943, 435, 436; 180/168, 169, 170, 171, 179; 700/302, 304; 702/165; 318/587

(56) References Cited

U.S. PATENT DOCUMENTS

| 5,215,159 | * | 6/1993 | Nishida ................................. 180/179 |
| 5,396,426 | | 3/1995 | Hibino et al. ........................ 364/460 |
| 5,400,864 | | 3/1995 | Winner et al. ....................... 180/169 |
| 5,444,346 | | 8/1995 | Sudo et al. ........................... 318/616 |
| 5,529,139 | * | 6/1996 | Kurahashi et al. ................... 180/169 |
| 5,587,908 | * | 12/1996 | Kajiwara .............................. 701/96 |
| 5,710,565 | | 1/1998 | Shirai et al. .......................... 342/70 |
| 5,731,977 | * | 3/1998 | Taniguchi et al. .................... 701/93 |
| 5,938,714 | * | 8/1999 | Satonaka ............................... 701/96 |
| 5,959,572 | * | 9/1999 | Higashimata et al. ................ 342/70 |
| 5,969,640 | * | 10/1999 | Timm et al. ......................... 340/903 |

FOREIGN PATENT DOCUMENTS

| 43 28747 | 3/1994 | (DE) . |
| 44 07082 | 9/1994 | (DE) . |
| 197 12232 | 10/1997 | (DE) . |
| 7-223457 | 8/1995 | (JP) . |

\* cited by examiner

Primary Examiner—Jacques H. Louis-Jacques
(74) Attorney, Agent, or Firm—Foley & Lardner

(57) ABSTRACT

In system and method for an automotive vehicle equipped with the system and defined as a system vehicle, a target value of a driving-and-braking force applied to the system vehicle to make a detected value of a system vehicle velocity coincident with a target value of the velocity of the system vehicle is determined, a prime mover of the system vehicle and a transmission thereof in accordance with the target value of the driving-and-braking force is determined, a maximum deceleration force according to the target value of the velocity of the system vehicle and a shift position of the transmission of the system vehicle is estimated, a relative velocity of the system vehicle to the preceding vehicle on the basis of the detected value of the inter-vehicle distance is determined, and the shift position of the transmission is determined on the basis of the target value of the driving-and-braking force, the estimated maximum deceleration force, and the relative velocity.

20 Claims, 14 Drawing Sheets

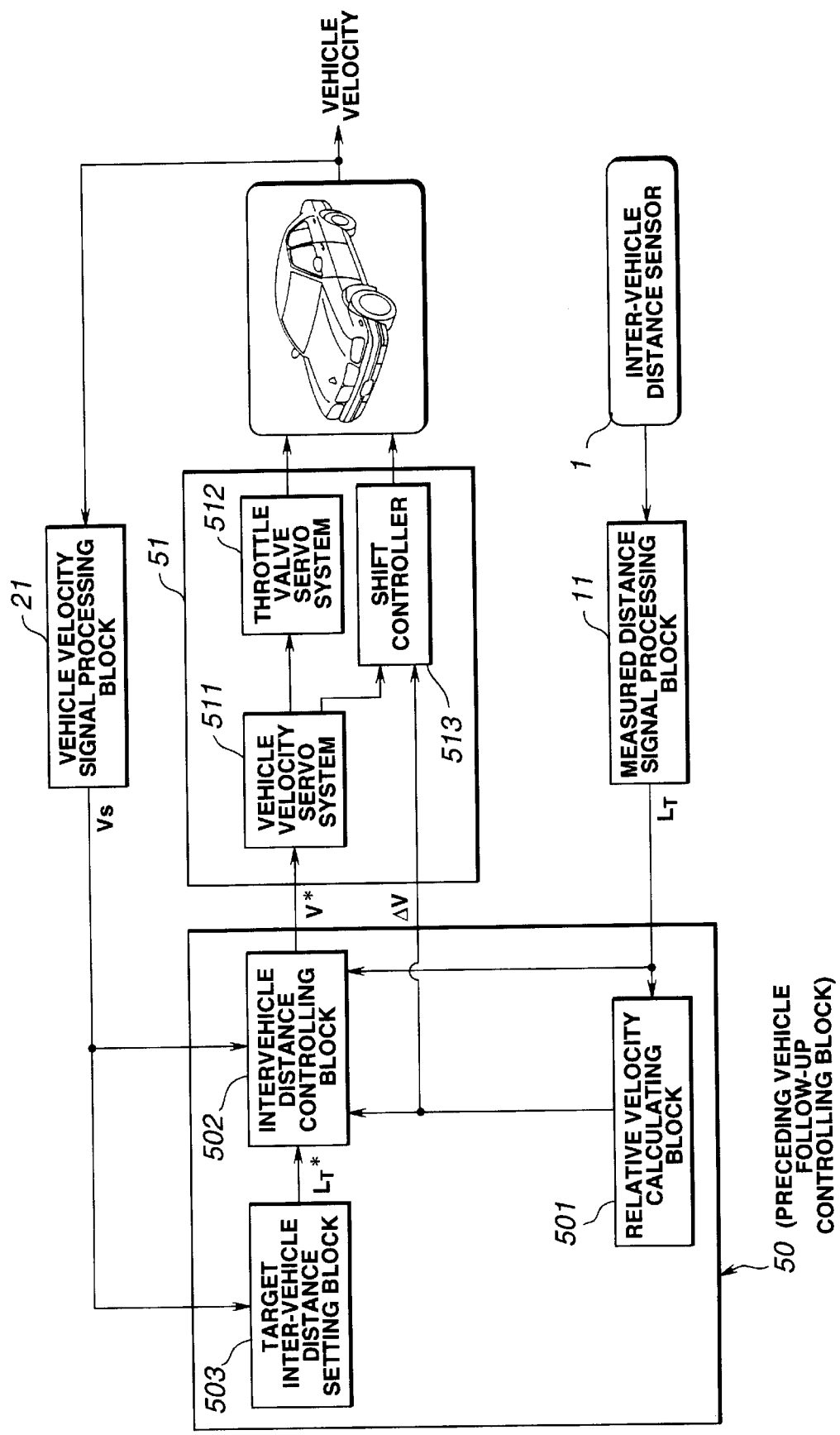

SYSTEM AND METHOD FOR CONTROLLING INTER-VEHICLE DISTANCE TO PRECEDING VEHICLE FOR AUTOMOTIVE VEHICLE EQUIPPED WITH THE SYSTEM AND METHOD

The contents of the Applications No. Heisei 9-294245 and Heisei 9-321404, with filing dates of Oct. 27, 1997 and Nov. 21, 1997 in Japan, are herein incorporated by reference.

BACKGROUND OF THE INVENTION a) Field of the Invention

The present invention relates to system and method for controlling an inter-vehicle distance to a vehicle traveling ahead (viz., a preceding vehicle) applicable to an automotive vehicle (hereinafter, referred to as a system vehicle) equipped with the system and method which can follow up the preceding vehicle maintaining a constant (safety) inter-vehicle distance.

b) Description of the Related Art

A Japanese Patent Application First Publication No. Heisei 7-223457 published on Aug. 22, 1995 exemplifies a previously proposed system for controlling the inter-vehicle distance to the preceding vehicle for the system vehicle in which different down-shift conditions and different up-shift conditions are set according to different road surface gradients such as on a flat road surface (a gradient of its road surface is generally zero), an ascending slope (a gradient of its road surface is generally positive), and a descending slope (a gradient of its road surface is generally negative).

SUMMARY OF THE INVENTION

In the previously proposed preceding inter-vehicle distance controlling system disclosed in the above-identified Japanese Patent Application First publication, maps on respective up-shift and down-shift conditions during the run of the system vehicle on the flat road surface, the ascending slope, and the descending slope are prepared empirically or experimentally. These maps are used to up-shift and down a transmission of the system vehicle during the actual running of the system vehicle. Since, however, it is difficult to prepare such maps as covering every road surface gradient or every running condition, appropriate timings of the up-shift and down-shift of the transmission with respect to the actual road surface gradient and actual running condition cannot be achieved so that up-shifting and down-shifting operations by the previously proposed system do not often match with a shift feeling given by a vehicle occupant(s).

Hence, it takes a tremendous amount of labor-hour costs to generate such maps as covering many road surface gradients and running conditions and a large capacity of memory are needed to store these maps.

In addition, in the previously proposed preceding vehicle follow-up controlling system, in a case where the follow-up run of the system vehicle on the descending slope is carried out, when the system vehicle is approaching to the preceding vehicle due to a braking operation of the preceding vehicle and due to a difference in the down-shift operation of both of the system vehicle and the preceding vehicle and in an engine braking force therebetween, the down-shift operation is carried out with a down-shift condition on the inter-vehicle distance being satisfied.

If the inter-vehicle distance of the system vehicle from the preceding vehicle becomes widened due to a deceleration of the system vehicle caused by the down-shift operation, the up-shift operation is again carried out since the up-shift condition is satisfied at this time.

When the up-shift operation is carried out since the inter-vehicle distance has again shortened to approach to the preceding vehicle, the down-shift operation is again carried out. When the down-shift operation is, then, carried out so that the inter-vehicle distance has again widened. Thereafter, the up-shift operation is again carried out.

When the system vehicle runs to follow up the preceding vehicle on the ascending slope, a, so-called, shift hunting phenomenon occurs and gives an unpleasant feeling to the occupant(s) of the system vehicle.

With these problems in mind, it is an object of the present invention to provide improved system and method for controlling the inter-vehicle distance to the preceding vehicle for the system vehicle equipped with the system and method which can carry out up-shift and down-shift operations for the transmission of the system vehicle at appropriate timings, preferably without occurrence of the, so-called, shift hunting phenomenon on a shift control, which match with a gear shift feeling on a transmission of the system vehicle given by the system vehicle occupant(s) with every road surface gradient and running condition taken into consideration and, preferably, do not give a pleasant feeling to the system vehicle occupant(s).

The above-described object can be achieved by providing a system for an automotive vehicle equipped with the system and defined as a system vehicle. The system comprises: a first detector for detecting an inter-vehicle distance from the system vehicle to a preceding vehicle traveling ahead of the system vehicle; a second detector for detecting a velocity of the system vehicle; an inter-vehicle distance controller for calculating a target value of the velocity of the system vehicle to make a detected value of the inter-vehicle distance coincident with the target value of the inter-vehicle distance; a system vehicle velocity controller for calculating a target value of a driving-and-braking force applied to the system vehicle to make a detected value of the system vehicle velocity coincident with the target value of the velocity of the system vehicle; a drive controller for drivingly controlling a prime mover of the system vehicle and a transmission thereof in accordance with the target value of the driving-and-braking force; a maximum deceleration force estimator for estimating a maximum deceleration force according to the target value of the velocity of the system vehicle and a shift position of the transmission of the system vehicle; a relative velocity calculator for calculating a relative velocity of the system vehicle to the preceding vehicle on the basis of the detected value of the inter-vehicle distance; and a shift position determinator for determining the shift position of the transmission on the basis of the target value of the driving-and-braking force, the estimated maximum deceleration force, and the relative velocity.

The above-described object can also be achieved by providing a method for an automotive vehicle equipped with the method and defined as a system vehicle. The method comprises the steps of: detecting an inter-vehicle distance from the system vehicle to a preceding vehicle traveling ahead of the system vehicle; detecting a velocity of the system vehicle; calculating a target value of the velocity of the system vehicle to make a detected value of the inter-vehicle distance coincident with the target value of the inter-vehicle distance; calculating a target value of a driving-and-braking force applied to the system vehicle to make a detected value of the system vehicle velocity coincident with the target value of the velocity of the system vehicle;

drivingly controlling a prime mover of the system vehicle and a transmission thereof in accordance with the target value of the driving-and-braking force; estimating a maximum deceleration force according to the target value of the velocity of the system vehicle and a shift position of the transmission of the system vehicle; calculating a relative velocity of the system vehicle to the preceding vehicle on the basis of the detected value of the inter-vehicle distance; and determining the shift position of the transmission on the basis of the target value of the driving-and-braking force, the estimated maximum deceleration force, and the relative velocity.

BRIEF DESCRIPTION OF THE DRAWINGS

FIG. 2 is a functional block diagram of the system for controlling an inter-vehicle distance to the preceding vehicle in the first preferred embodiment shown in FIGS. 1A and 1B.

BEST MODE FOR CARRYING OUT THE INVENTION

Reference will hereinafter be made to the drawings in order to facilitate a better understanding of the present invention.

(First Embodiment)

Figure 1A:
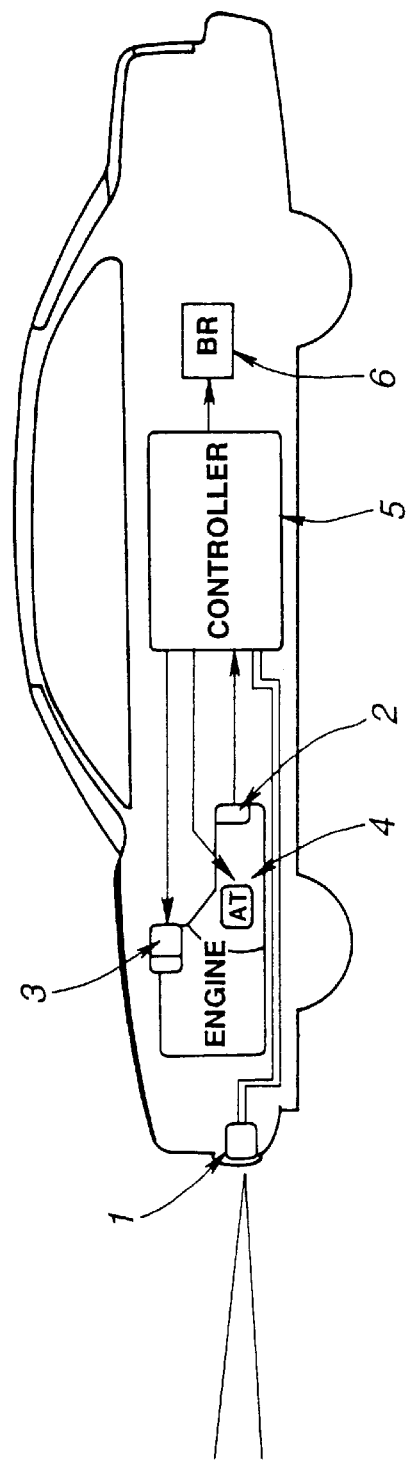
FIG. 1A is a schematic side view of an automotive vehicle to which a system for controlling an inter-vehicle distance to a preceding vehicle traveling ahead in a first preferred embodiment according to the present invention is applicable.

FIG. 1A shows an explanatory view of an automotive vehicle (viz., system vehicle) to which the system for controlling an inter-vehicle distance to a preceding vehicle traveling ahead of the system vehicle in a first preferred embodiment according to the present invention is applicable.

In FIG. 1A, an inter-vehicle distance sensor head 1 is a sensor head of a radar type such that a laser beam is scanned over a given scanning angle in a width-wise direction of the system vehicle and the reflected beams are received from an object(s) present in, generally, a forward detection zone defined by the scanning angle to detect the object(s), e.g., a preceding vehicle. It is noted that an electromagnetic wave or ultra-sonic wave may be used in place of the laser beam.

A vehicle velocity sensor 2, attached onto an output axle of an automatic transmission 4, outputs a pulse train signal whose period is in accordance with a revolution velocity of the output axle of the automatic transmission 4.

A throttle valve actuator 3 (constituted, for example, by a DC motor) actuates a throttle valve of an engine associated with the automatic transmission 4 to be opened or closed in response to a throttle valve opening angle signal so as to vary an intake air quantity to be supplied to the engine to adjust an engine output torque. The automatic transmission 4 varies a gear shift ratio thereof in accordance with a vehicle velocity and the engine output torque. In the first preferred embodiment, the automatic transmission 4 is a forward four speed automatic transmission having an OD (OverDrive) function. A braking system 6 serves to develop a braking force to be applied to the system vehicle shown in FIG. 1A.

Figure 1B:
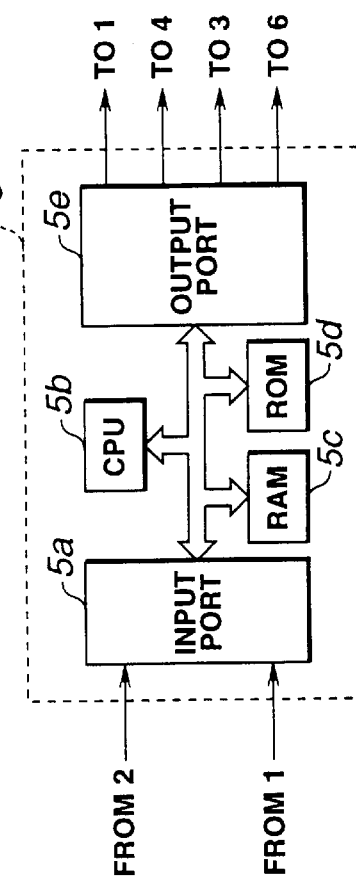
FIG. 1B is a circuit block diagram of a controller shown in FIG. 1A.

A controller 5 includes a microcomputer and its peripheral circuit. The microcomputer of the controller 5 includes, as shown in FIG. 1B, a CPU (Central Processing Unit) 5b, a ROM (Read Only Memory) 5d, a RAM (Random Access Memory) 5c, an Input Port 5a, an Output Port 5e, and a common bus.

FIG. 2 shows a software structure of the controller 5, viz., a functional block diagram of the inter-vehicle distance controlling system in the second preferred embodiment.

In FIG. 2, an inter-vehicle distance measuring block 11 measures a time duration from a time at which the laser beam is scanned and transmitted to the forward detection zone to a time at which the reflected beams from the objects are received to calculate an inter-vehicle distance $L_T$ of one of the objects which is the preceding vehicle. It is noted that, if a plurality of preceding vehicles are present, one of the preceding vehicle needs to be specified and, thereafter, the inter-vehicle distance $L_T$ to be the specified preceding vehicle needs to be calculated.

A method of selecting one of the preceding vehicles from the objects is well known. For example, a U.S. Pat. No. 5,710,565 issued on Jan. 20, 1998 discloses the method of selecting the preceding vehicle from the plurality of beam reflecting objects (the disclosure of which is herein incorporated by reference).

A vehicle velocity signal processing block 21 measures the period of the pulse train signal from the vehicle velocity sensor 2 to detect the system vehicle velocity Vs.

A preceding vehicle follow-up controlling block 50 includes a relative velocity calculating block 501, an inter-vehicle distance controller 502, and a target inter-vehicle distance setting block 503, and calculates a target inter-vehicle distance $L_T^*$ and a target vehicle velocity V* on the basis of the detected inter-vehicle distance $L_T$ from the inter-vehicle distance measuring block 11 and the detected vehicle velocity Vs from the vehicle velocity signal processing block 21.

The relative velocity calculating block 501 calculates the relative velocity (ΔV) of the system vehicle from the preceding vehicle on the basis of the measured (detected value of the) inter-vehicle distance $L_T$. For example, the relative velocity calculating block includes a band pass filter having a transfer function of $\omega n s^2/(s^2+2\zeta\omega n s+\omega n^2)$, wherein ωn denotes a specific frequency, s denotes a Laplace transform operator, and ζ denotes a damping factor.

The inter-vehicle distance controlling block 502 calculates a target system vehicle velocity V* to make the detected value of the inter-vehicle distance $L_T$ coincident with the target inter-vehicle distance $L_T^*$ with the calculated relative velocity ΔV taken into consideration.

Furthermore, the target inter-vehicle distance setting block 503 sets the target inter-vehicle distance $L_T^*$ in accordance with the system vehicle velocity Vs or the preceding vehicle velocity $V_T$.

A vehicle velocity controller 51 controls the opening angle of the engine throttle valve via the throttle valve actuator 3, the gear shift ratio of the automatic transmission 4, and the braking force of the braking system 6 to make the system vehicle velocity Vs coincident with the target vehicle velocity V* calculated by the preceding vehicle follow-up controlling block 50. The vehicle velocity controller 51 includes: a vehicle velocity servo system 511; a throttle valve servo system 512; and a shift controller 513. The vehicle velocity controller 51 controls the opening angle of the throttle actuator 3 to make the system vehicle velocity Vs coincident with the target value of the velocity of the system vehicle V*, controls the gear shift ratio of the automatic transmission 4, and controls the braking force 6 of the system vehicle.

The vehicle velocity servo system 511 calculates a command value of the opening angle of the throttle valve to be supplied to the throttle actuator 3 to coincide with the system vehicle velocity Vs with the target value of the system velocity V* and calculates a margin (immunity) of a deceleration force of the system vehicle as will be described later.

In this embodiment, a robust model matching control technique is used to design the velocity servo system 511.

The throttle valve servo system 512 drivingly controls the throttle actuator 3 in accordance with the command value of the opening angle of the throttle valve. The shift controller 513 determines executions of the up-shift and down-shift of the automatic transmission 4 from a lower speed range to a higher speed range and vice versa on the basis of the deceleration force margin and the relative velocity ΔV to drivingly control the automatic transmission 4.

Figure 3:
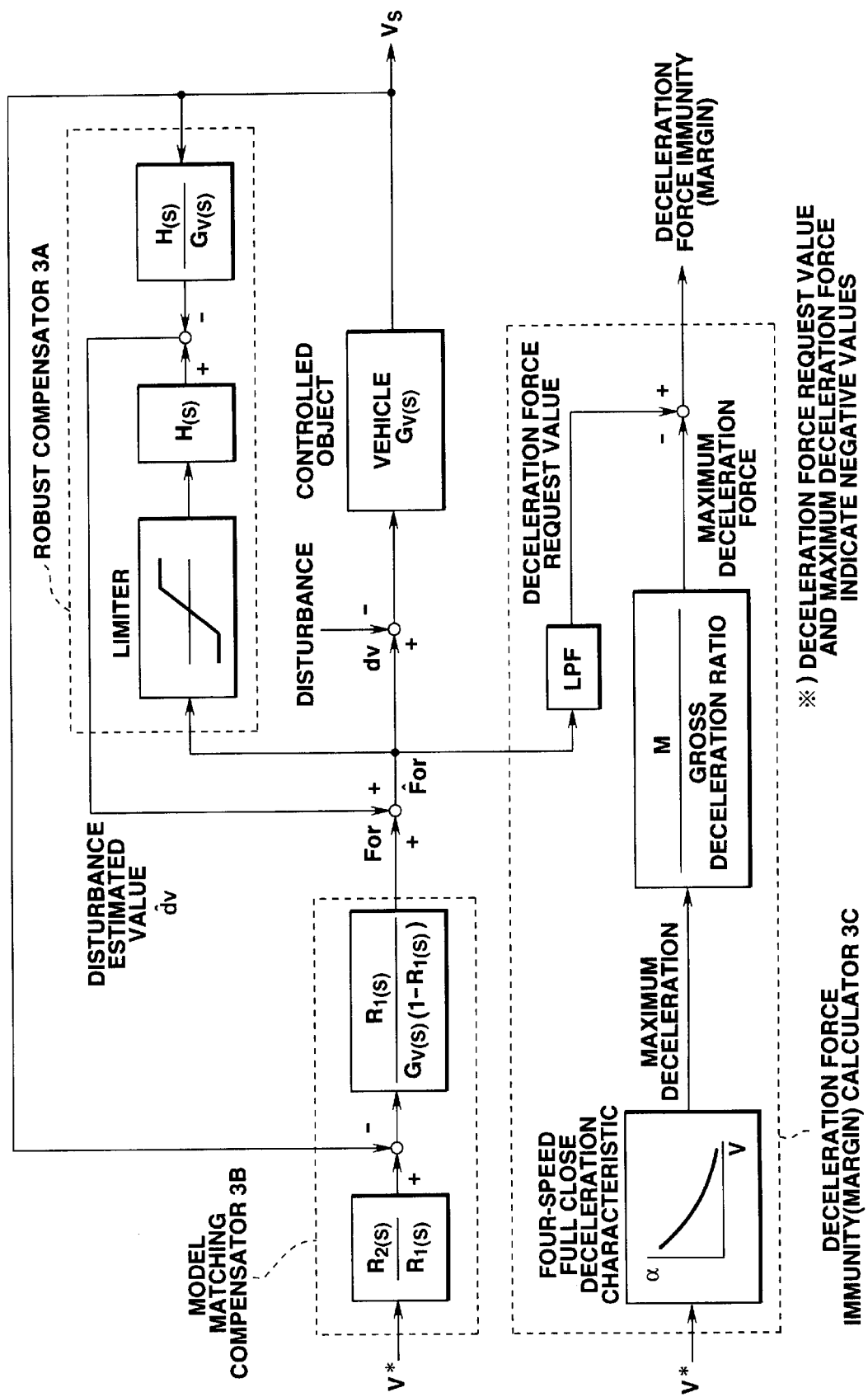
FIG. 3 is a functional block diagram of a vehicle velocity servo system using a robust model matching control technique.

FIG. 3 shows a functional block diagram of the velocity servo system 511 using the robust model matching control technique.

The velocity servo system includes a robust compensator 3A; a model matching compensator 3B; and a deceleration margin calculator 3C.

In FIG. 3, Gv(s) denotes a transfer function of a mathematical model of the system vehicle which is an object to be controlled when a target value ^For of the driving force is a manipulated (operating) variable and the vehicle velocity Vs is a controlled variable.

The transfer characteristic Gv(s) does not include a dead time element which corresponds to a first-order lag in a power train of the system vehicle.

The robust compensator 3A serves to actuate a disturbance dv such as a running resistance, a wind pressure, and so on externally applied to the system vehicle so as to have an influence on the system performance.

In FIG. 3, H(s) denotes a transfer function of a low pass filter (LPF) in the robust compensator 3A and a limiter is provided.

The target value ^For of the driving force passed through the limiter is passed through the low pass filter of H(s).

Although not shown in FIG. 3, the target value ^For of the driving force after passing through the low pass filter is multiplied by the dead time element which corresponds to the first order lag of the power train of the system vehicle to derive a present actual driving force. This present actual driving force includes a driving force generated by the disturbance such as the running resistance in addition to the driving force to maintain the velocity Vs of the system vehicle.

On the other hand, a compensator H(s)/Gv(s) is a multiplication of an inverse of the mathematical model Gv(s) of the system vehicle by the low pass filter H(s). The system vehicle velocity Vs is processed by this compensator to derive the driving force to maintain the present velocity Vs of the system vehicle. A deviation between the target value of the driving force passed through the low pass filter of H(s) and the driving force passed through the compensator of H(s)/Gv(s) corresponds to the driving force generated by the disturbance such as the running resistance, viz., the estimated value ^dv of the disturbance.

The model matching compensator 3B in FIG. 3 calculates the command value For of the driving force to make the velocity Vs of the system vehicle coincident with the target value of the velocity V* of the system vehicle, a responsive characteristic of the object to be controlled being made coincident with a given characteristic.

It is noted that the model matching compensator includes a transfer function expressed as $R_2(s)/R_1(s)$ in the model matching compensator; a deviator for deriving the deviation between an output from a block expressed as R1(s)/{Gv(s)(1−R1(s))} and the velocity of the system vehicle Vs.

It is also noted that the command value For of the driving force calculated by the model matching compensator is added to the estimated value ^dv of the disturbance from the robust compensator to output the target value ^For of the driving force described above to the object to be controlled viz., the system vehicle expressed as Gv(s).

It is noted that the robust model matching technique is exemplified by a U.S. Pat. No. 5,444,346 issued on Aug. 22, 1995 (although it is expressed in a z transform)(the disclosure of which is herein incorporated by reference).

In the first embodiment, a deceleration force margin is defined as a deviation between a request value of the deceleration force and a maximum deceleration force derived according to the target vehicle velocity V* at the fourth speed range (OverDrive; OD function is active).

The deceleration force margin calculator 3C derives the deceleration force request value from the target value ^For of the driving force passed through another low pass filter (LPF) having a cut off frequency of, for example, about 0.5 Hz.

In addition, from a characteristic of a deceleration α with respect to the vehicle velocity V when the throttle valve is fully closed with the shift position of the automatic transmission 4 placed at the fourth speed range (OD), the deceleration force margin calculator 3C calculates the maximum deceleration corresponding to the target value V* of the velocity of the system vehicle using a table look-up technique, multiplies the calculated maximum deceleration by the vehicle mass M, and divides the M multiplied maximum deceleration by (fourth speed gear ratio×final gear ratio) to determine the maximum deceleration force at the fourth speed range of the automatic transmission 4.

The deceleration force margin is derived by subtracting the maximum deceleration force from the deceleration force request value.

As the deceleration force margin becomes large, a necessity to change the shift position into the lower speed range, viz., the necessity of the down-shift becomes low.

Conversely, as the deceleration force margin becomes minor, the necessity of down-shifting the automatic transmission 4 to a lower speed range becomes high.

Next, a method of determining the down-shift and up-shift operations will be described below.

In this embodiment, the down-shift condition is such that ① $\Delta V \leq 0$ (the system vehicle approaches to the preceding vehicle since $\Delta V = V_T - V^*$ ($V_T$ denotes a velocity of the preceding vehicle) and ② the deceleration force margin $\leq$ SG1. Conversely, the up-shift condition is such that ③ $\Delta V > 0$ (the system vehicle becomes far way from the preceding vehicle) or ④ the deceleration force margin $\geq$ SG2.

It is noted that SG1 and SG2 denote threshold values and SG1<SG2 to prevent a shift hunting phenomenon as will be described later.

In a case where the system vehicle is approaching to the preceding vehicle so that an absolute value of the relative velocity $\Delta V$ is increased ($\Delta V > 0$), a large request value of the deceleration force is calculated.

Hence, the down-shift is carried out when the deceleration force margin is equal to or below the first threshold value SG1.

At this time, if the down-shift timing were too late, the system vehicle would exceedingly approach to the preceding vehicle to give a kind of anxiety to the system vehicle occupant(s).

Hence, in this embodiment, the first threshold value SG1 is modified according to the magnitude of the relative velocity $\Delta V$.

Figure 4:
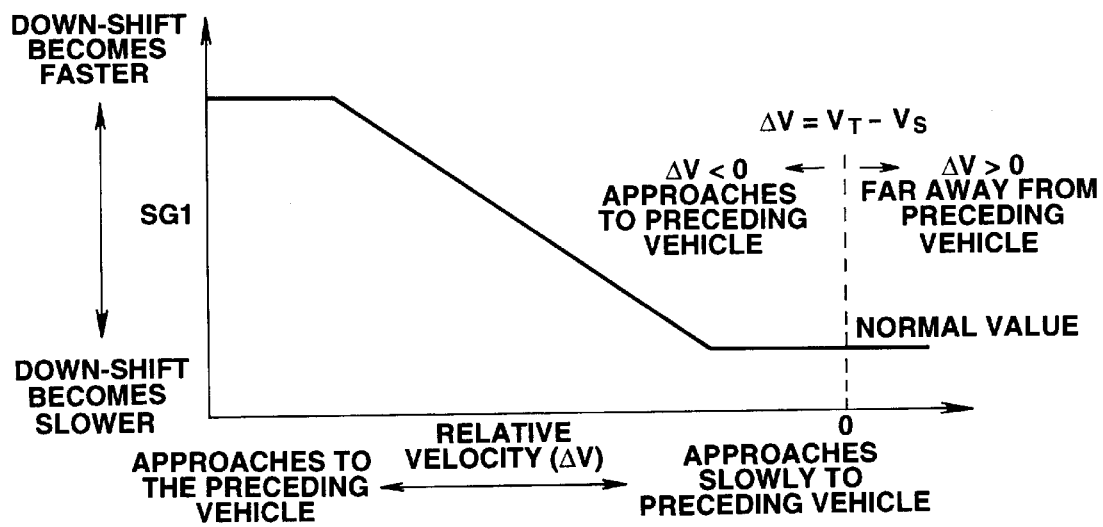
FIG. 4 is a characteristic graph representing an example of a variation of a first threshold value SG1 with respect to a variation in a magnitude of the relative velocity ($\Delta V$) of the system vehicle to the preceding vehicle in the first embodiment.

FIG. 4 shows an example of the modification of the first threshold value SG1 according to the relative velocity $\Delta V$.

As shown in FIG. 4, the first threshold value SG1 indicates a normal fixed value when the relative velocity $\Delta V$ ranges from zero to a predetermined value (positive or negative value with the zero relative velocity $\Delta V$ as a center) and becomes larger as the absolute value of the relative velocity $\Delta V$ becomes large and the system vehicle approaches to the preceding vehicle to make the timing of the down-shift at an earlier stage.

Hence, as the absolute value of the relative velocity $\Delta V$ becomes increased, viz., the value of the relative velocity $\Delta V$ becomes negatively increased, the down-shift is carried out at an earlier stage.

If the magnitude of the relative velocity $\Delta V$ becomes smaller, the down-shift is carried out at a normal timing. It becomes possible to make the down-shift operation which is matched with the shift feeling given by the system vehicle occupant(s).

On the other hand, in a case where another vehicle is interrupted in the inter-vehicle distance between the system vehicle and the preceding vehicle and the system vehicle approaches to the interrupting other vehicle even if the throttle valve is fully closed, it is necessary to carry out the down-shift of the automatic transmission 4. In this case, since the large deceleration force request value is calculated, the down-shift operation is carried out since the deceleration force margin is equal to or below the first threshold value SG1.

However, if a new inter-vehicle distance between the system vehicle and the interrupting other vehicle is short, the kind of feeling of anxiety would be given to the system vehicle occupant(s).

Hence, in the first embodiment, the first threshold value SG1 is modified according to the new inter-vehicle distance between the system vehicle and the interrupting other vehicle (the other vehicle becomes the present preceding vehicle as viewed from the system vehicle).

Figure 5:
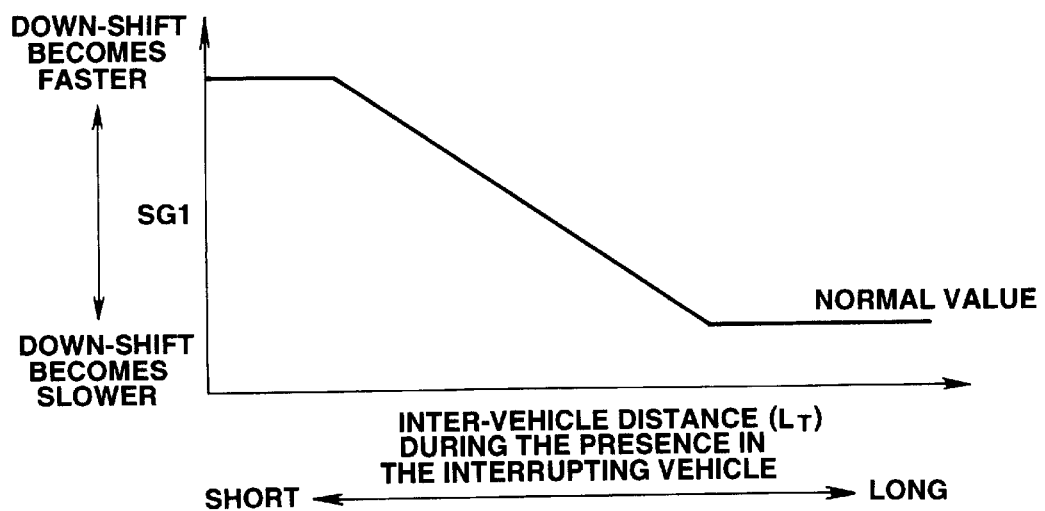
FIG. 5 is a characteristic graph representing an example of a variation of the first threshold value SG1 with respect to a new inter-vehicle distance ($L_T$) of the system vehicle to another vehicle interrupting into a space as the inter-vehicle distance before the system vehicle.

As shown in FIG. 5, as the inter-vehicle distance becomes short during the presence of the interrupting other vehicle, the first threshold value SG1 becomes large to make the down-shift timing at the earlier stage. Hence, the down-shift operation is carried out at the earlier stage as the inter-vehicle distance during the interruption of the other vehicle becomes short and at the normal time as the inter-vehicle distance becomes long.

Consequently, it becomes possible to make the down-shift operation which is matched with the shift feeling given by the system vehicle occupant(s).

It is noted that in a case wherein the relative velocity between the system vehicle and the interrupting other vehicle is negatively large, the controller 5 selects one of the first threshold values SG1 according to the relative velocity $\Delta V$ shown in FIG. 4 and according to the inter-vehicle distance shown in FIG. 5 which is larger than the other.

Figure 6A:
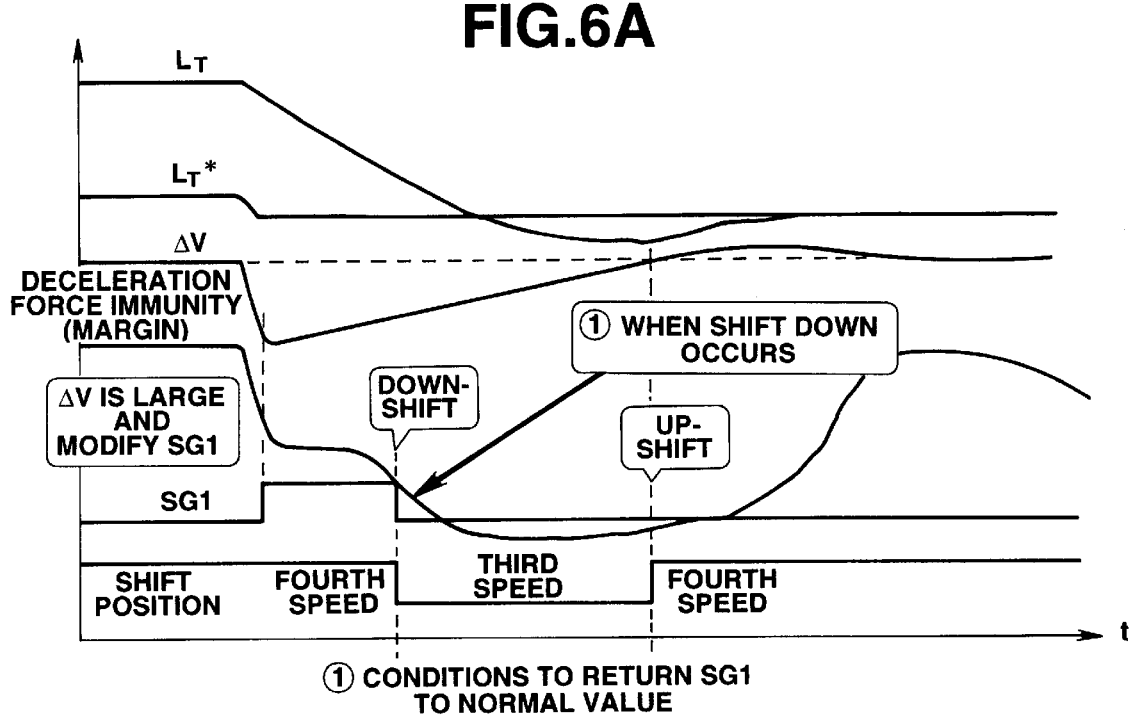
FIGS. 6A and 6B are signal timing charts for explaining the threshold value on the down-shift operation to be returned to its original value.
Figure 6B:
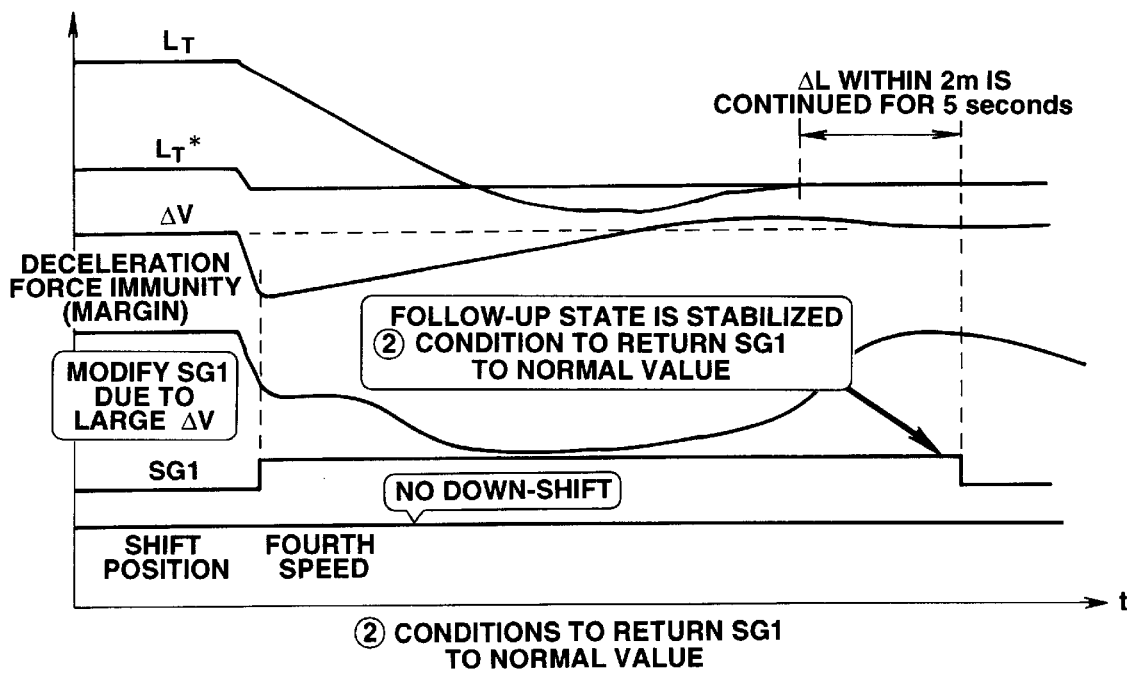

It is also noted that after the first threshold value SG1 is modified according to the relative velocity $\Delta V$ and/or according to the new inter-vehicle distance between the system vehicle and interrupting other vehicle, when, as shown in FIG. 6A, the down-shift operation is completed when ① the deceleration force margin is equal to or below the first threshold value SG1 or when, as shown in FIG. 6B, ② a state in which the deviation ($\Delta L (=L_T - L_T^*)$ or Vs–V*) on the inter-vehicle distance or on the system vehicle velocity of the system vehicle is within a predetermined value is continued for a predetermined period of time, in other words, when the controller 5 determines that the system vehicle is running to follow up the preceding vehicle stably at the target value of the inter-vehicle distance, the controller 5 returns the modified first threshold value SG1 to its original value (the normal value).

Figure 7:
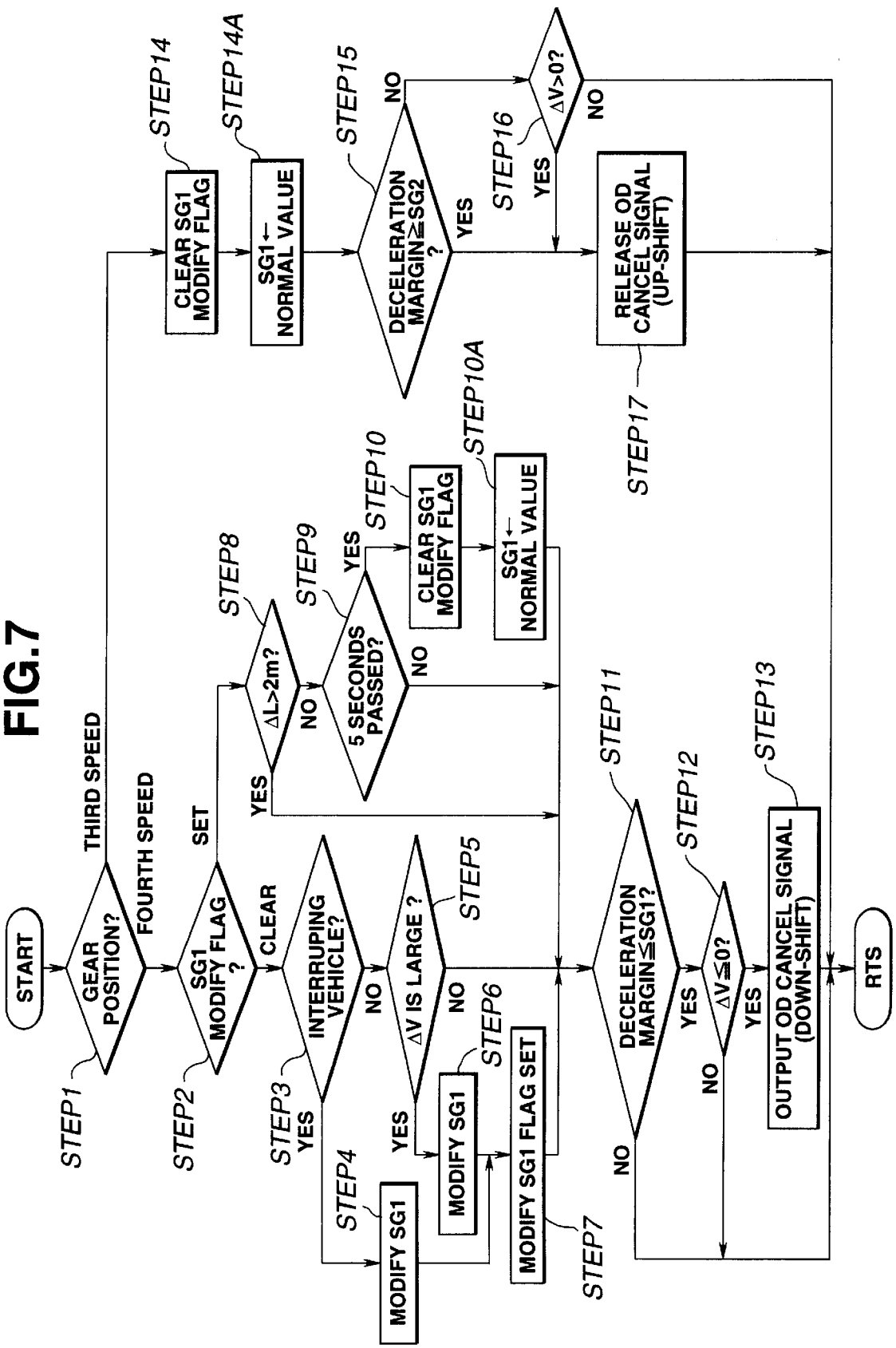
FIG. 7 is an operational flowchart executed by the controller shown in FIG. 1B for explaining up-shift and down-shift operations carried out in the first embodiment.
Figure 8A:
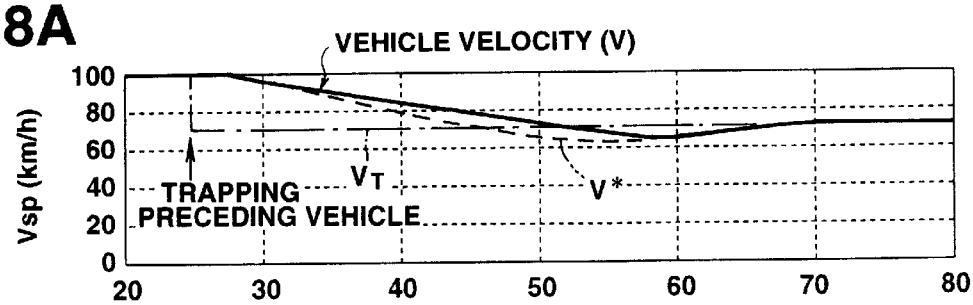
FIGS. 8A, 8B, 8C, 8D, and 8E are characteristic graphs each representing results of simulations in a shift control in the first embodiment.
Figure 8B:
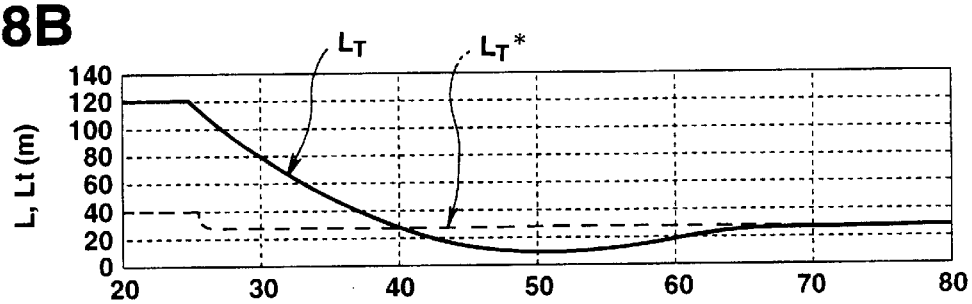
Figure 8C:
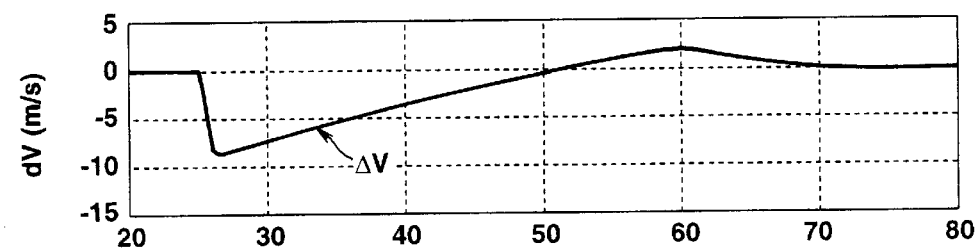
Figure 8D:
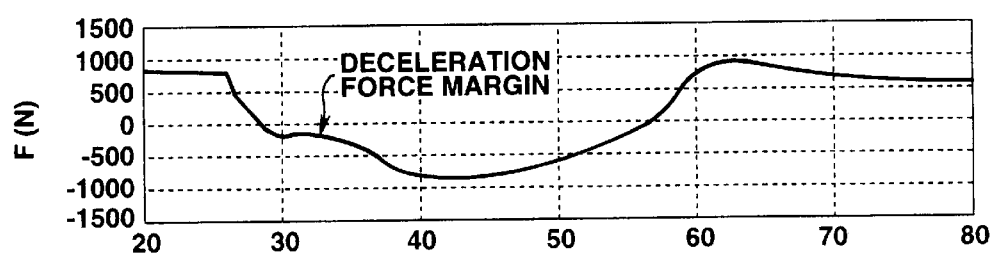
Figure 8E:
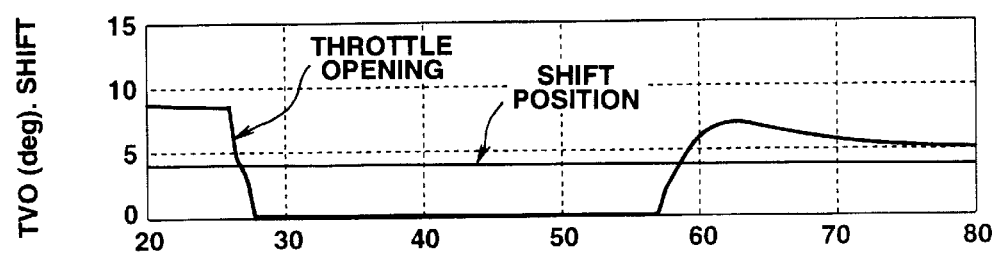
Figure 9A:
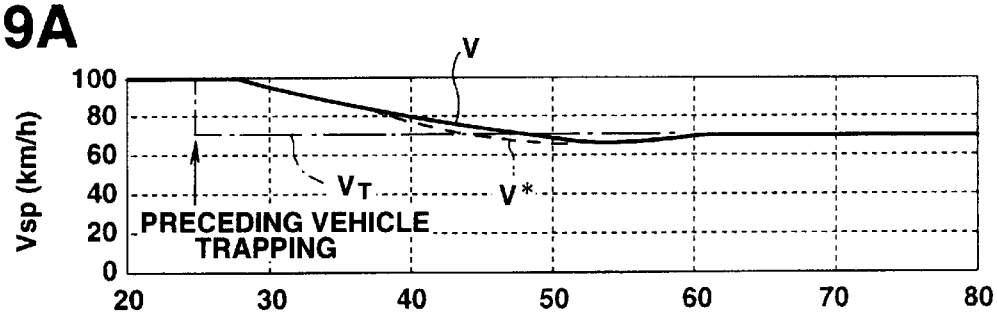
FIGS. 9A, 9B, 9C, 9D, and 9E are characteristic graphs each representing results of simulations in the shift control in the first embodiment.
Figure 9B:
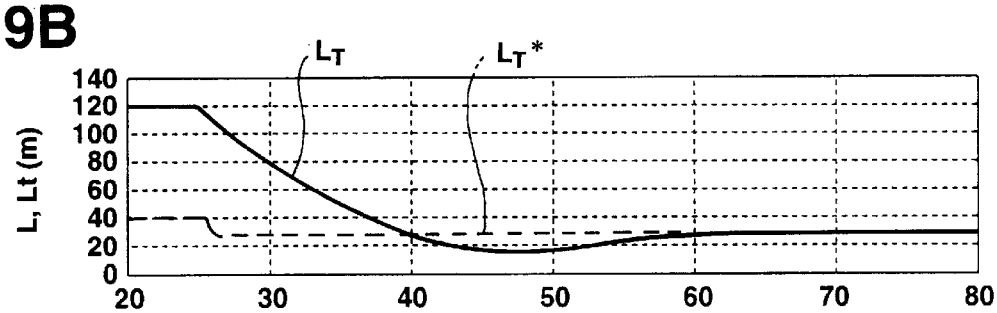
Figure 9C:
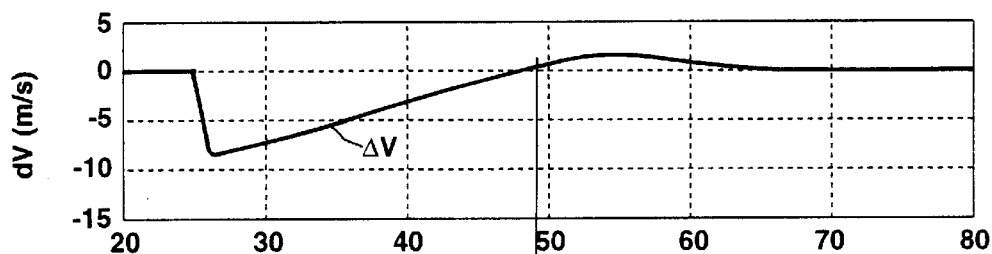
Figure 9D:
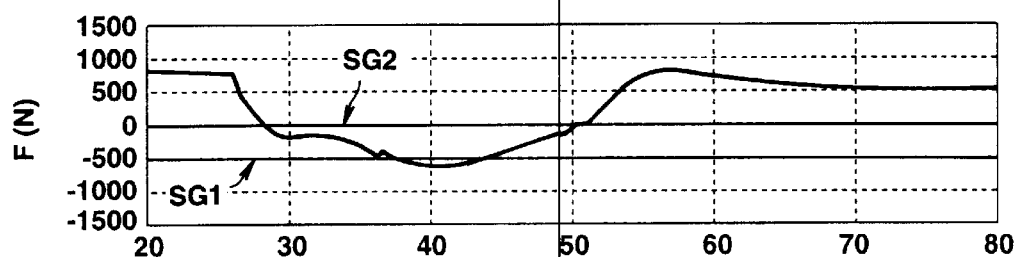
Figure 9E:
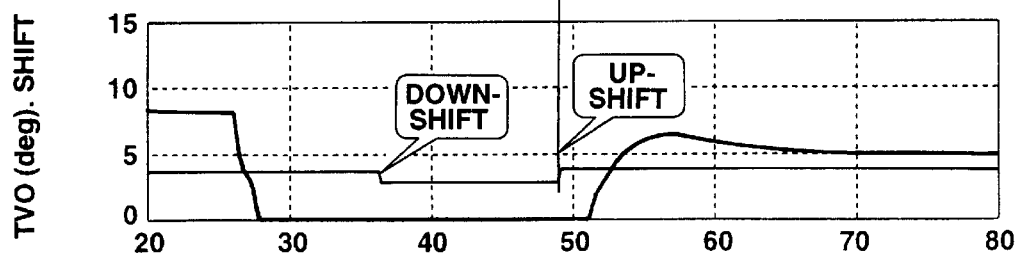
Figure 10A:
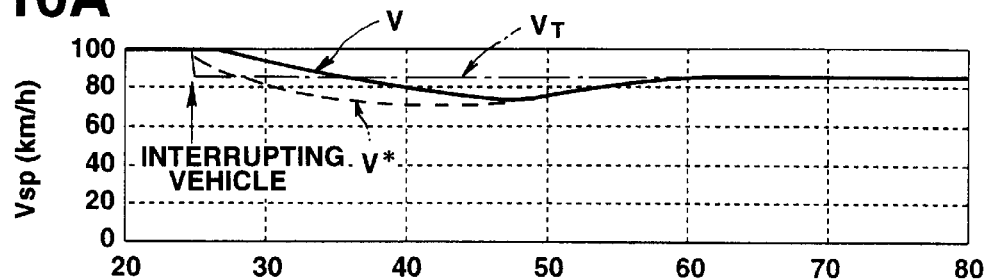
FIGS. 10A, 10B, 10C, 10D, and 10E are characteristic graphs each representing results of simulations in the shift control in the first embodiment.
Figure 10B:
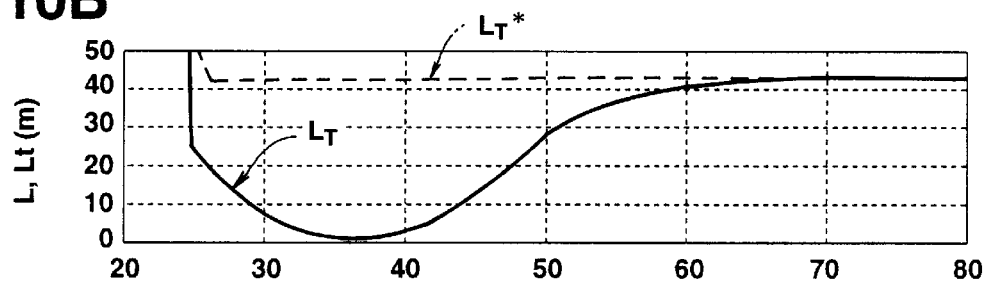
Figure 10C:
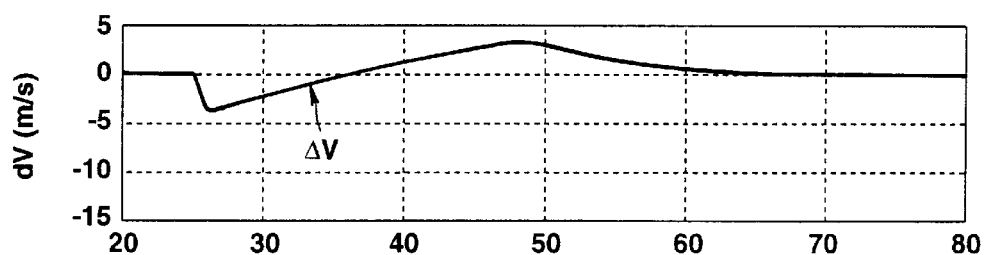
Figure 10D:
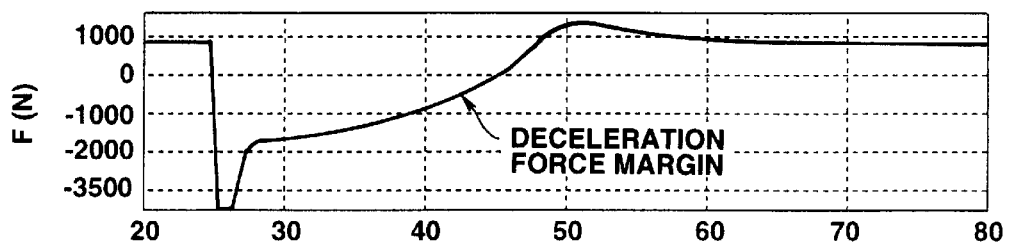
Figure 10E:
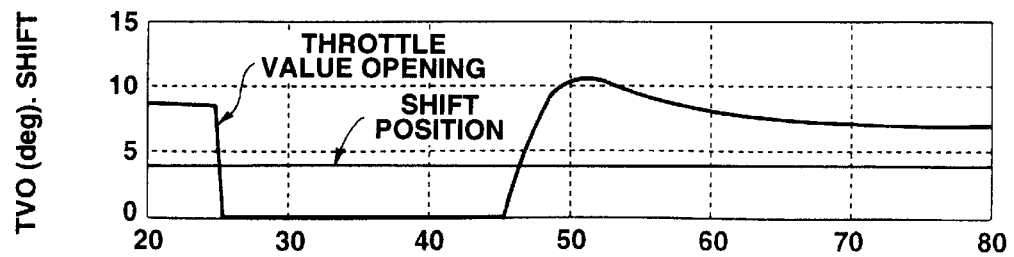
Figure 11A:
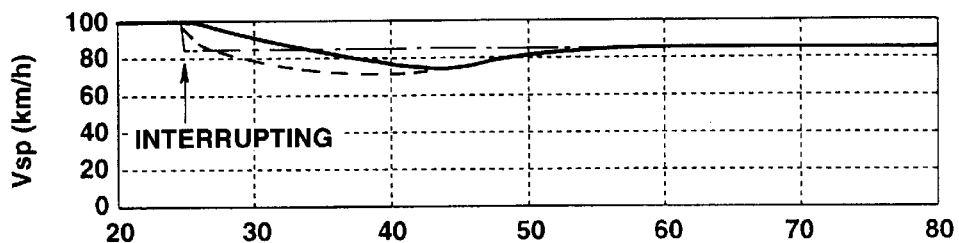
FIGS. 11A, 11B, 11C, 11D, and 11E are characteristic graphs each representing results of simulations in the shift control in the first embodiment.
Figure 11B:
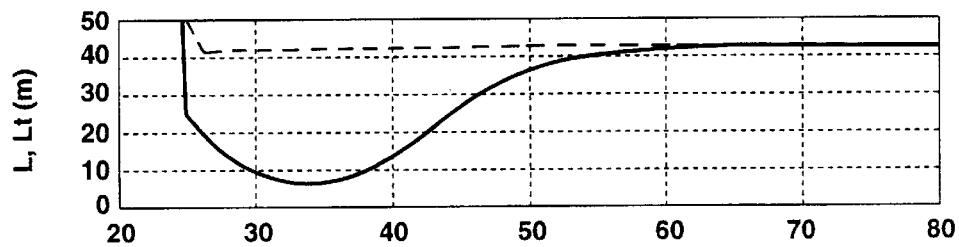
Figure 11C:
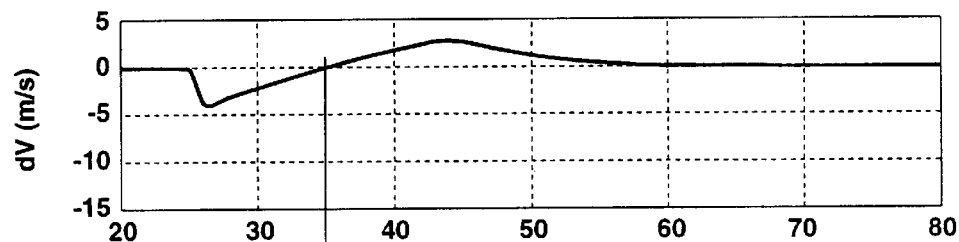
Figure 11D:
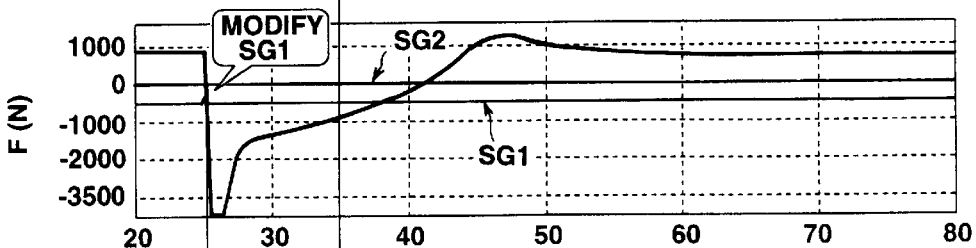
Figure 11E:
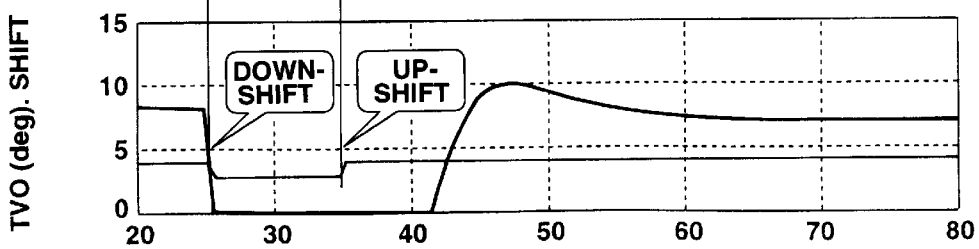
Figure 12A:
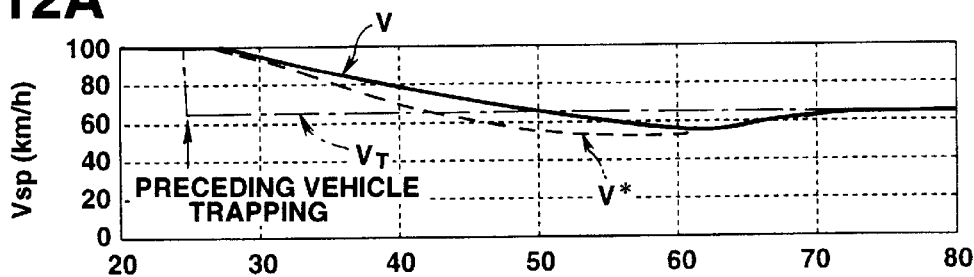
FIGS. 12A, 12B, 12C, 12D, and 12E are characteristic graphs each representing results of simulations in the shift control in the first embodiment.
Figure 12B:
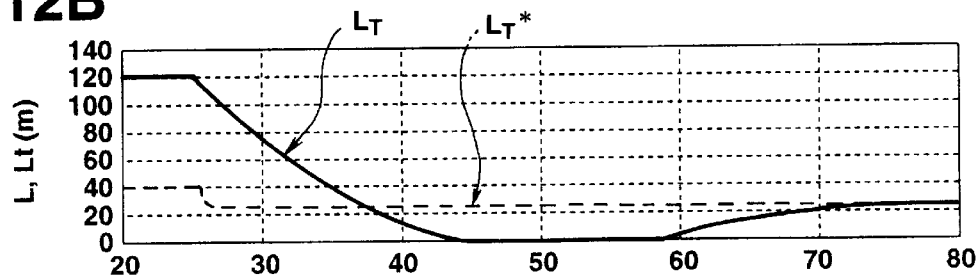
Figure 12C:
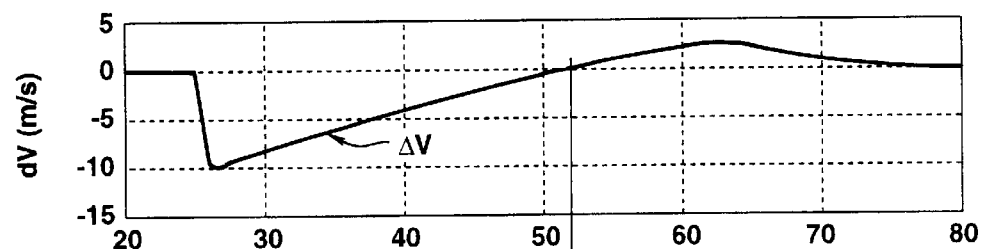
Figure 12D:
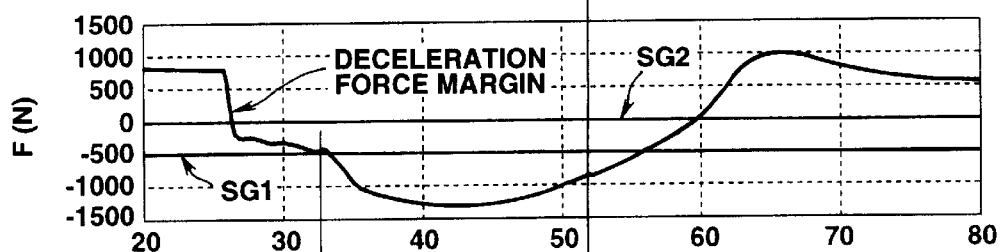
Figure 12E:
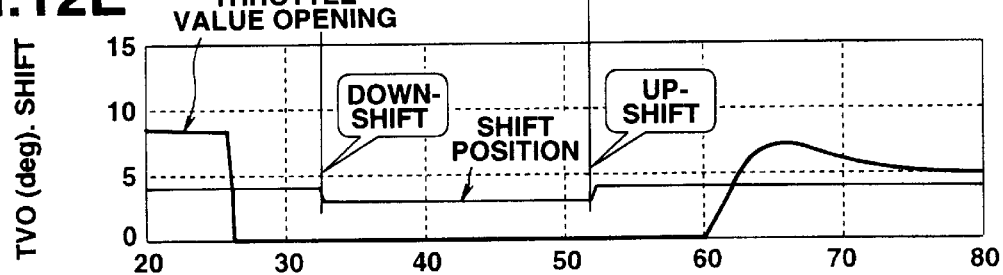
Figure 13A:
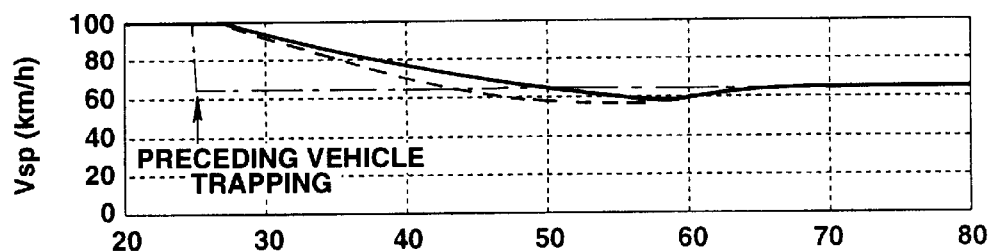
FIGS. 13A, 13B, 13C, 13D, and 13E are characteristic graphs each representing results of simulations in the shift control in the first embodiment.
Figure 13B:
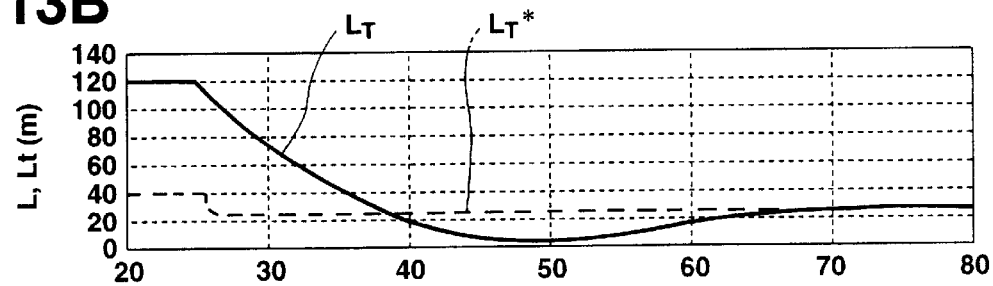
Figure 13C:
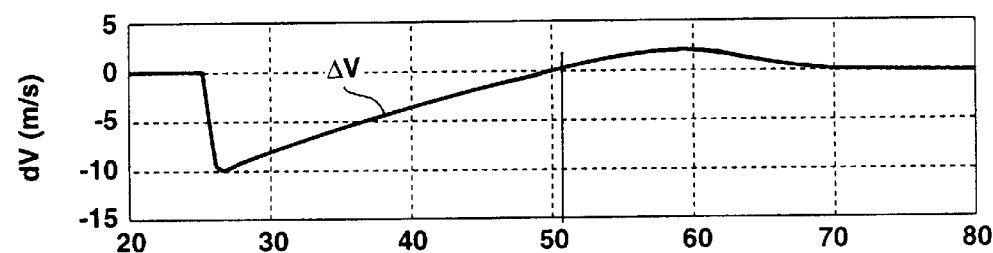
Figure 13D:
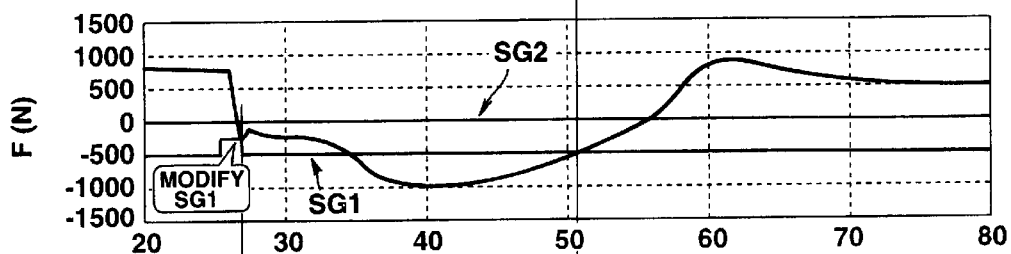
Figure 13E:
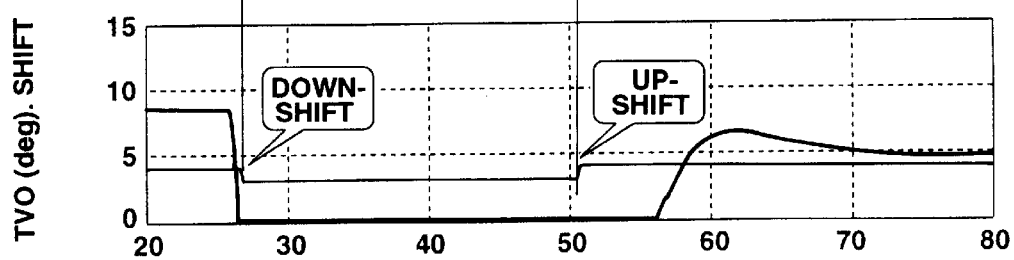

FIG. 7 shows an operational flowchart representing the up-shift and down-shift operations executed in the controller 5 shown in FIG. 1B.

This flowchart of FIG. 7 explains the operation of the first preferred embodiment.

That is to say, the CPU 5b of the controller 5 confirms whether the present gear shift range position is placed at the third speed range or at the fourth speed range (OD) at a first step STEP1.

If the answer is the fourth speed range (OD) at the first step STEP1, the routine goes to a step STEP2. If the answer is the third speed range at the first step STEP1, the routine goes to a step STEP14.

In a case where the system vehicle is presently running at the fourth speed range (OD), the controller 5 confirms whether the modify flag indicating that the first threshold value SG1 is modified is set to "1" or reset to "0" at the step STEP2.

If the modify flag is set to "1" at the step STEP2, the routine goes to a step STEP8.

If the modify flag is reset to "0" at the step STEP2, the routine goes to a step STEP3.

At the step STEP3, the CPU $5b$ of the controller 5 determines whether the interrupting other vehicle is present on the basis of, for example, a variation rate of the detected value $L_T$ of the inter-vehicle distance.

If the interrupting other vehicle is present (YES) at the step STEP3, the routine goes to a step STEP4 at which the CPU $5b$ modifies the first threshold value SG1 according to the new inter-vehicle distance between the system vehicle and the interrupting other vehicle, viz., in accordance with a map shown in FIG. 5.

At the subsequent step STEP7, the CPU $5b$ of the controller 5 sets the modify flag to "1".

If no interrupting vehicle is present (NO) at the step STEP3, the routine goes to a step STEP5. At the step STEP5, the CPU $5b$ of the controller 5 confirms whether the magnitude of the relative velocity $\Delta V$ is large so that the system vehicle is approaching to the preceding vehicle.

If $\Delta V \leq 0$ ($|\Delta V| \geq 0$) (YES) at the step STEP5, the routine goes to a step STEP6 in which the CPU $5b$ of the controller 5 modifies the threshold value SG1 in accordance with the map shown in FIG. 4. At the subsequent step STEP7, the first threshold modify flag is set. It is noted that the first threshold value SG1 is not needed to be modified when the magnitude of the relative velocity $\Delta V$ is small (No at the step STEP5).

In a case where the first threshold modify flag is already set at the step STEP2, the CPU $5b$ of the controller 5 determines whether the deviation between the target value of the inter-vehicle distance $L_T^*$ and of the actual inter-vehicle distance $L_T$ is in excess of 2 meters. If the deviation ($\Delta L$) between the target value ($L_T^*$) and the detected value of the inter-vehicle distance is within 2 meters (No at the step STEP8) and the state in which the deviation ($\Delta L$) is within 2 meters is continued for 5 seconds (Yes at the step STEP10), the CPU $5b$ of the controller 5 determines that the system vehicle is running under the stable follow-up running condition and goes to a step STEP10.

Together with the clear of the first threshold value modify flag, the down-shift threshold value SG1 is returned to its original value (normal value) at a step STEP10A.

If the deviation ($\Delta L$) between the target value of the inter-vehicle distance exceeds 2 meters or the state in which the deviation ($\Delta L$) between the inter-vehicle distance is within 2 meters is not continued for 5 seconds, the routine goes to a step STEP11 without return of the first threshold value SG1 to the normal value.

It is noted that if the deviation ($\Delta L$) between the target value of the velocity of the vehicle and the detected value of the system velocity which is within the predetermined value is continued for the predetermined value, the CPU $5b$ of the controller 5 determines that the system vehicle is running to follow up the preceding vehicle stably at the target value of the preceding vehicle.

When the modification processing of the down-shift first threshold value SG1 is completed at the step STEP11 to determine whether the deceleration force margin is equal to or below the down-shift threshold value SG1.

If the deceleration force margin is longer than the first threshold value, the controller 5 determines that the deceleration force SG1 is sufficient even at the present gear position and the processing is ended without the down-shift operation.

On the other hand, if the deceleration force margin is equal to or below the first threshold value SG1 at the step STEP11 (yes), the routine goes to a step STEP12.

At the step STEP12, the CPU $5b$ of the controller 5 determines whether the relative velocity is equal to or below zero, viz., whether the system vehicle is approaching to the preceding vehicle.

If the system-vehicle is not approaching to the preceding vehicle ($\Delta V > 0$ No at the step STEP12), the CPU $5b$ of the controller 5 ends the whole processing without the down-shift operation.

If the system vehicle is approaching to the preceding vehicle (Yes at the step STEP12), the routine goes to a step STEP13 in which an OD (OverDrive) cancel signal is outputted to the automatic transmission 4 to down-shift from the fourth speed range to the third speed range.

When the present gear position is determined to be the third speed range at the step STEP1, the CPU $5b$ of the controller 5 clears the modify flag of the first threshold value SG1 at the step STEP14 and returns the normal value to the first threshold value SG1 at the subsequent step STEP14A.

At the subsequent step STEP15, the CPU $5b$ of the controller 5 calculates the deceleration force margin and confirms whether the deceleration force margin is equal to or above the up-shift threshold value SG2.

If the deceleration margin is equal to or above the second threshold value SG2 (Yes at the step STEP15), the present routine goes to a step STEP17.

At the step STEP17, the CPU $5b$ of the controller 5 releases the OD cancel switch signal to up-shift operation.

The automatic transmission 4 in which the OD cancel signal is released to up-shift the gear position from the present third speed range to the fourth speed range (OD).

On the other hand, if the deceleration force margin is smaller than the second threshold value SG2 (deceleration force margin<SG2, i.e., NO at the step STEP15), the routine goes to a step STEP16. (It is noted that DECELERATION MARGIN recited at the steps STEP11 and STEP15 corresponds to the deceleration force margin.)

At the step STEP16, the CPU $5b$ of the controller 5 determines whether the relative velocity is larger than zero, viz., whether the preceding vehicle becomes far way from the preceding vehicle.

When the system vehicle is far way from the preceding vehicle (Yes $\Delta V > 0$ at the step STEP16), the routine goes to a step STEP17 since the CPU $5b$ of the controller 5 determines that the sufficient deceleration force is obtained and releases the OD cancel signal to perform the up-shift operation. If is noted that when the relative velocity $\Delta V$ is equal to or below zero and the system vehicle is approaching to the preceding vehicle, the processing is ended without the up-shift operation.

FIGS. 8A through 13E show results of simulations carried out in the first preferred embodiment of the preceding vehicle follow-up controlling system.

FIGS. 8A through 8E and 9A through 9E show results of simulations by the system vehicle when the system vehicle during the run at 100 Km/h trapped the preceding vehicle running at 70 Km/h in the forward direction of the inter-vehicle distance 120 meters ahead.

FIGS. 8A, 8B, 8C, 8D, and 8E show the case of no shift control.

FIGS. 9A, 9B, 9C, 9D, and 9E show the case of the shift control execution (SG1=−500N, SG2=0).

As shown in FIGS. 9A through 9E in which the shift control as in the first and second embodiments is carried out, the excessive approach to the preceding vehicle is not found, the quick convergence to the target value of the inter-vehicle distance was resulted, and a stable run to follow-up the preceding vehicle was resulted.

FIGS. 10A, 10B, 10C, 10D, 10E, 11A, 11B, 11C, 11D, and 11E are the results of simulations in the case where while the system vehicle was running at the velocity of the system vehicle of 100 Km/h and at the inter-vehicle distance of 50 meters to the preceding vehicle, the other vehicle running at 85 Km/h were interrupted in a space before 25 meters.

FIGS. 10A, 10B, 10C, 10D, and 10E show the second simulation results in the case where no shift change control was done.

FIGS. 11A, 11B, 11C, 11D, and 11E show the results of simulations in the case where the shift control operation is present (before the interruption of the other vehicle, SG1=−500 N and, after the interruption of the other vehicle, SG1=−250N and SG2=0).

If the shift control is carried out in the first embodiment (refer to FIGS. 11A through 11E), no excessive approach to the preceding vehicle was resulted, the quick convergence to the target value of the inter-vehicle distance was resulted, and the stable follow-up run to the preceding vehicle in a short period of time was resulted.

FIGS. 12A through 13E show the case where the system vehicle trapped the preceding vehicle at the inter-vehicle distance of 120 meters during the run of the system vehicle at the velocity of 100 Km/h.

FIGS. 12A, 12B, 12C, 12D, 12E show the case where no modification of the first threshold value SG1.

FIGS. 13A, 13B, 13C, 13D, and 13E show the case where the modification of the first threshold value SG1 (or the second threshold value SG2) is present (before the trap SG1=−500N, SG2=0 and after the trap SG1=−250N and SG2=0).

As shown in the case of the modification of the threshold value) of FIGS. 13A through 13E, the excessive approach to the preceding vehicle is not present, the quick convergence to the target value of the inter-vehicle distance was carried out in a short period of time, and the stable follow-up run to the preceding vehicle was resulted.

As described in the first embodiment of the inter-vehicle distance controlling system according to the present invention, the deceleration force margin is derived between the deceleration force request value calculated by the vehicle velocity servo system to which the robust model matching control technique is applied and the deceleration force margin according to a difference between the maximum deceleration force generated at the present shift position thereat is derived.

When the deceleration force margin is equal to or below the first threshold value SG1 and the relative velocity to the preceding vehicle is equal to or below zero, the gear position is shifted down from the fourth speed range to the third speed range.

In addition, if the deceleration force margin is equal to or above SG2 which determine the up-shift operation or the vehicle velocity to the preceding vehicle is equal to or above zero, the CPU 5b of the controller 5 shifts up from the third speed range to the fourth speed range.

Furthermore, when the magnitude of the relative velocity is large and the other vehicle is interrupting into the inter-vehicle distance, the first threshold value SG1 which determines the down-shift may be modified according to the inter-vehicle distance during the presence of the interrupting vehicle or according to the relative velocity.

Hence, without use of the maps on the up-shift and down-shift conditions, for every road surface condition or for every running condition, or when the relative velocity between the system vehicle and the interrupting other vehicle is large, the up-shift-and-down is carried out at the appropriate timing which matches with the shift feeling by the occupants.

The deceleration force request value which is an internal variable of the system velocity servo system 511 includes a value having the disturbance such as a road surface gradient variation so that the value required according to the road surface gradient is calculated.

For example, in a case where the inter-vehicle distance to the preceding vehicle on the descending slope is tried to be maintained, a larger deceleration force request value should be calculated since it becomes nearer to the preceding vehicle when the system vehicle runs on the descending slope.

Since the deceleration force margin is varied according to the road surface gradient calculated using the deceleration force request value, the present invention is applicable to every road surface gradient without a special processing such as modifying the first and second threshold values SG1 and SG2 during the shift control operation at the descending slope and ascending slope.

It is noted that, in the first embodiment described above, the up-shift operation from the fourth speed range (OD) to the third speed range and the down-shift from the fourth speed range (OD) to the third speed range are exemplified, the present invention is not limited to the shift control between the fourth speed (OD) and the third speed. It is noted that the automatic transmission 4 used in the system vehicle is not limited to the forward four-speed range type with the OD function as described in the first embodiment.

(Second Embodiment)

A second preferred embodiment of the inter-vehicle distance controlling system for controlling the inter-vehicle distance to the preceding vehicle (traveling ahead) will be described below.

It is noted that since the structure in the preceding vehicle inter-vehicle distance controlling system in the second embodiment is generally the same as that in the first embodiment, the following description will be made only on a difference of the second embodiment from the first embodiment.

In this embodiment, the down-shift condition is such that ① (relative velocity $\Delta V$)$\leq 0$ since the system vehicle is approaching to the preceding vehicle and ② (acceleration force margin)$\leq SG1$.

Conversely, the up-shift condition is such that ③ (relative velocity)$>0$ (becomes far way from the preceding vehicle) and ④ (deceleration force margin)$\geq SG2$.

It is noted that the value of each threshold SG1 and SG2 are set as SG1<SG2 to prevent the hunting phenomenon of the (gear) shift control.

It is noted that the second threshold value is set to be the minor value for the shift position of the automatic transmission 4 to be shifted up at the earlier stage before the throttle valve of the engine is about to be open in order to present the gear shift shock from occurring at the time when the gear is up-shifted.

Next, the shift hunting phenomenon will be described below.

In a case where the system vehicle is running to follow up the preceding vehicle during the runs of both of the system vehicle and the preceding vehicle on the ascending slope and an effect of the deceleration of the system vehicle due to the engine braking is smaller than the effect of the deceleration of the preceding vehicle due to the engine braking, the system vehicle gradually approaching to the preceding vehicle to satisfy the down-shift condition and the down-shift operation is carried out.

In addition, it is often the case where the occupant of the preceding vehicle often carries out the braking operation through its braking system and manually or automatically shifts down the present shift position due to the preceding vehicle occupant's unpleasant feeling on the increase of the velocity of the preceding vehicle.

In the latter case, the system vehicle approaches to the preceding vehicle to satisfy the down-shift condition and the automatic transmission 4 of the system vehicle carries out the down-shift operation to the lower speed range such as the third speed range.

When the effect of the deceleration of the system vehicle due to the engine braking is larger than that 9of the preceding vehicle, the inter-vehicle distance to the preceding vehicle becomes wide so that the up-shift condition is satisfied and the gear position of the automatic transmission 4 of the system vehicle up-shifts to the lower speed range such as the fourth speed range (OD).

In addition, when the braking operation is released from the state wherein the occupant of the preceding vehicle carries out the braking operation, the velocity of the preceding vehicle due to the runs of both of the system vehicle and the preceding vehicle on the descending slop becomes faster, the inter-vehicle distance becomes widened, and the up-shift operation is carried out.

Then, when the up-shift operation is carried out, the system vehicle again approaches to the preceding vehicle and shifts down the present gear position.

Since these operations are repeated, the shift hunting has been developed.

Such a shift hunting phenomenon as described above occurs due to a difference between the effect of decelerations in both system vehicle and preceding vehicle due to the respective engine brakes during the full close of the engine throttle valves.

In addition, in a case where the system vehicle under the preceding vehicle follow-up condition is running on the descending slope, the shift hunting phenomenon is easy to occur due to the braking operation in the preceding vehicle.

If the second threshold value SG2 which serves as the determination criterion of the up-shift condition is set to a certain large value, the shift phenomenon can be prevented but the shift shock during the up-shift becomes large and becomes unfavorable.

Hence, in the second embodiment, the CPU 5b of the controller 5 estimates the gradient of the road surface on which the system vehicle runs together with the preceding vehicle.

While the gradient of the road surface is in excess of a predetermined value, viz., when the controller 5 determines that the system vehicle is running on such a descending slope and having a large negative gradient, the shift hunting is prevented by inhibiting the up-shift operation after the down-shift operation.

As described above, since the disturbance is estimated using the velocity servo system to which the robust model matching technique is applied, the road surface gradient is estimated on the basis of the estimated value of this disturbance.

It is noted that, although the disturbance may be considered to be caused by the variation in the running wind pressure in addition to being mainly caused by the gradient of the road surface, the disturbance estimated value during the run of the preceding vehicle on the follow-up condition to the preceding vehicle may be considered to represent mainly the state of the road surface gradient.

The road surface gradient is, hence, determined on the basis of the disturbance estimated value.

In the second embodiment, the up-shift of the gear position is inhibited when the estimated value of the disturbance $\leq$ SG3.

If the disturbance estimated value indicates negative when the run on the descending slope and indicates positive during the run on the ascending slope.

The disturbance estimated value $\leq$ SG3 means the descending slope having a steep gradient to some degree. While the up-shift inhibit condition is satisfied, no up-shift occurs even if the up-shift condition is satisfied.

Although the down-shift operation does not occur even if the up-shift inhibit condition is satisfied, the up-shift does not occur after the up-shift inhibit condition is satisfied.

Hence, after the down-shift occurs with the system vehicle approached to the preceding vehicle during the runs of both vehicles on the descending slope, no up-shift occurs until the road surface gradient becomes moderate. The development of the shift hunting can be prevented from occurring.

Figure 14:
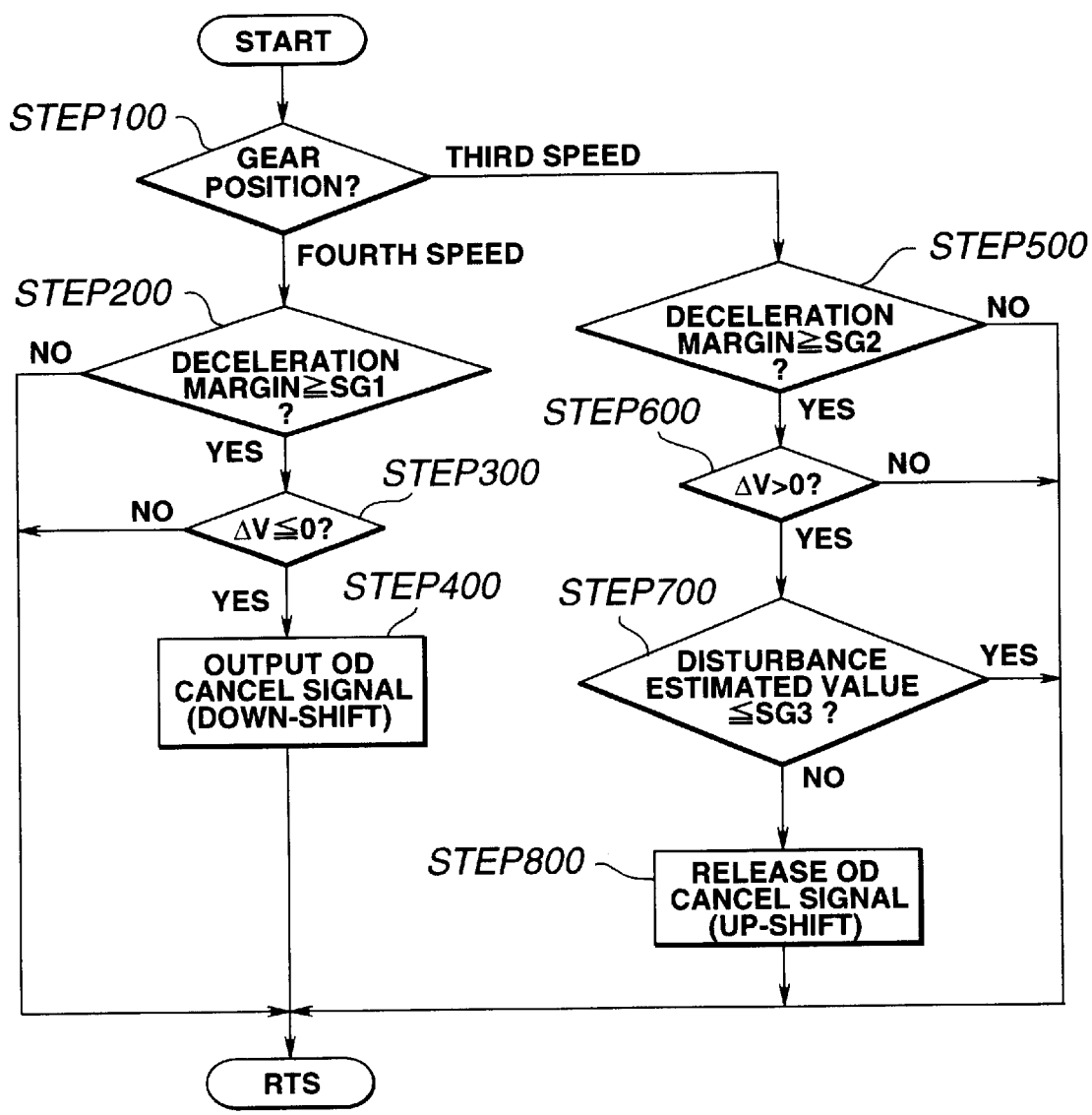
FIG. 14 is an operational flowchart for explaining up-shift and down-shift operations executed in a second preferred embodiment of the inter-vehicle distance controlling system according to the present invention.

Next, FIG. 14 shows an operational flowchart of a shift control routine executed in the second embodiment.

Hence, the up-shift and down-shift operations in the second embodiment can be explained with reference to FIG. 14.

That is to say, at a step STEP100, the CPU 5b of the controller 5 confirms whether the present shift position of the automatic transmission 4 is placed at the fourth speed range or at the third speed range.

If at the third speed range at the step STEP100, the routine goes to a step STEP500.

If at the fourth speed range at the step STEP100, the routine goes to a step STEP200.

During the run of the system vehicle at the fourth speed range, the CPU 5b of the controller 5 compares the deceleration force margin with the first threshold value SG1. If the deceleration force margin is equal to or below the first threshold value SG1 (deceleration force margin $\leq$ SG1) (Yes) at the step STEP200, the CPU 5b of the controller 5 determines whether the value of the relative velocity ($\Delta V$) is negative or equal to zero, viz., whether the system vehicle is approaching to the preceding vehicle at a step STEP300.

If the relative velocity ($\Delta V$) is positively larger than zero ($\Delta V > 0$) at the step STEP300 (NO), the CPU 5b of the controller 5 determines that the deceleration force is sufficient even at the present shift (gear speed range) position (fourth speed range) and the processing routine of FIG. 14 is ended without the down-shift operation.

In a case where the present shift position is insufficient, the CPU 5b of the controller 5 confirms whether the system vehicle is approaching to the preceding vehicle ($\Delta V \leq 0$) at the step STEP300.

If $\Delta V > 0$ (NO) at the step STEP300, the CPU 5b of the controller 5 determines that the preceding vehicle becomes far away from the system vehicle and the processing routine of FIG. 14 is ended without the down-shift operation.

If no deceleration force margin is present since the deceleration force margin $\leq$ SG1 and the system vehicle is approaching to the preceding vehicle at zero or below zero of the relative velocity $\Delta V$ ($\Delta V \leq 0$), the down-shift condition is satisfied. Hence, at a step STEP400, an OD cancel signal is transmitted to the automatic transmission 4. The automatic transmission 4 at which the OD cancel signal is received shifts down from the fourth speed range to the third speed range.

During the run of the system vehicle at the third speed range, the CPU 5*b* of the controller 5 compares the deceleration force margin with the second threshold value SG2. If the deceleration force margin≧the second threshold value SG2 (YES) at the step STEP500, the routine goes to a step STEP600. If the deceleration force margin<SG2 (NO) at the step STEP500, the processing routine of FIG. 14 is ended.

At the step STEP600, the CPU 5*b* of the controller 5 determines whether the relative velocity to the preceding vehicle is larger than zero, viz., whether the preceding vehicle becomes far away from the system vehicle.

If ΔV≦0 (NO) at the step STEP600, the processing routine of FIG. 14 is ended without the up-shift operation.

If the deceleration force margin≧SG2 so that there is a margin in the deceleration force (Yes at the step STEP500) and ΔV>0 (yes at the step STEP600), the routine goes to a step STEP700 (since the up-shift operation is satisfied).

When the up-shift condition is satisfied, the CPU 5*b* of the controller 5 determines whether the up-shift inhibit condition is satisfied at the step STEP700.

In details, at the step STEP700, the CPU 5*b* of the controller 5 compares the disturbance estimated value with the third threshold value (SG3).

If the disturbance estimated value is equal to or below the threshold value SG3 (Yes at the step STEP700), the CPU 5*b* of the controller 5 determines that the system vehicle is running on the descending slope having the negative large road surface gradient and the present processing routine of FIG. 14 is ended without the release of the OD cancel signal.

If the estimated value of the disturbance is larger than the threshold value (SG3) (NO) at the step STEP300, the routine goes to a step STEP800 in which the OD cancel signal is released so that the automatic transmission 4 shifts up from the third speed range to the fourth speed range in accordance with the shift pattern determined according to the vehicle velocity and opening angle of the throttle valve.

Figure 15A:
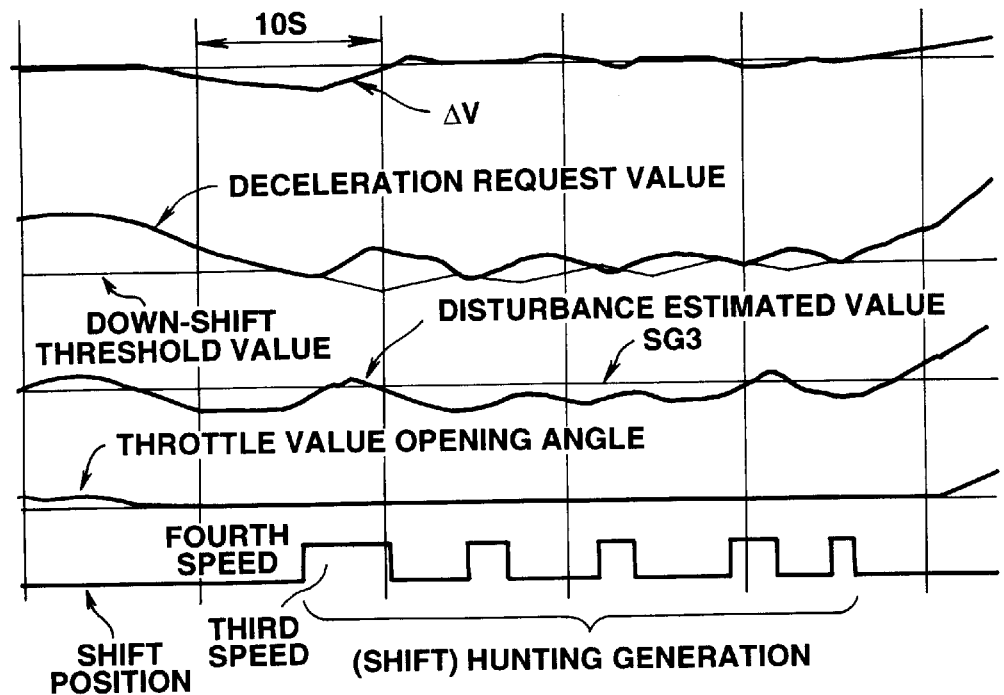
FIGS. 15A and 15B are signal timing charts of the preceding vehicle follow-up controlling system when no shift hunting preventive control as in the second embodiment is carried out and when the shift hunting preventive control is carried out as in the second embodiment.
Figure 15B:
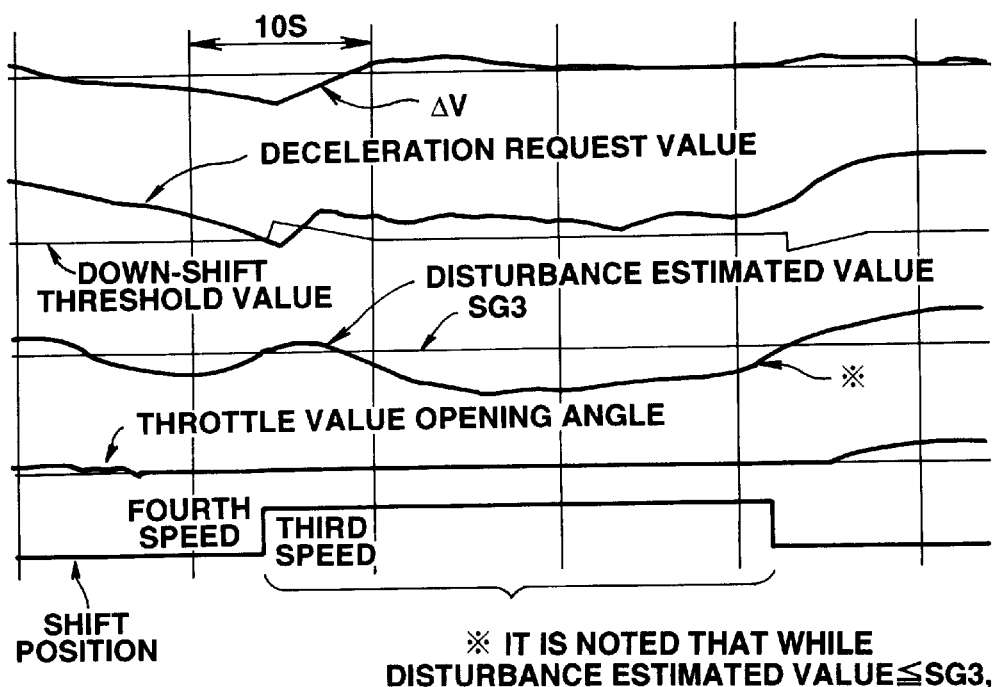

FIGS. 15A and 15B show results of simulations when the preceding vehicle follow-up control is carried out with respect to the preceding vehicle during the run of the system vehicle at about 65 Km/h on the descending slope having the negative gradient.

FIG. 15A shows the case of the shift hunting preventive shift control as described above.

FIG. 15B shows the case of no shift hunting preventive shift control.

It is noted that −0.5 [m/ss], −0.25[m/s], and −0.5 [m/ss] are set for the threshold values of SG1, SG2, and SG3 as the deceleration values. It is also noted that a subscript of ss means $s^2$.

As appreciated from FIGS. 15A and 15B, in the case where the shift hunting preventive measure is made as in the second embodiment, no up-shift occurs when the estimated value of −0.5 [m/ss] even if the up-shift condition is satisfied so that no shift hunting occurs.

While the gradient of the road surface is estimated and the estimated value of the road surface gradient is in excess of the predetermined value (third threshold value (SG3)), the up-shift is inhibited after the down-shift operation is carried out until the road surface gradient becomes moderate to some degree, the shift hunting can be prevented and the up-shift operation can be carried out which matches with the drive feeling by the occupant(s) of the system vehicle.

It is noted that the term of negatively means that the absolute value becomes larger in the negative direction and the term of positively means that the absolute value becomes larger in the positive direction.

It is also noted that the third detector (an interrupting vehicle detector) corresponds to the distance sensor head 1 and the measured distance processing block 11 of FIG. 2 and step STEP3 in FIG. 7 and the third detector detects the presence of the interrupting vehicle according to, for example, the remarkable variation in the inter-vehicle distance.

It is also noted that longitudinal axes in FIGS. 8A, 9A, 10A, 11A, 12A, and 13A denote Vsp (velocity in km/h), those in FIGS. 8B, 9B, 10B, 11B, 12B, and 13B denote L and Lt (detected and target inter-vehicle distance) in meters, those in FIGS. 8C, 9C, 10C, 11C, 12C, and 13C denote dV (relative velocity) in m/s, those in FIGS. 8D, 9D, 10D, 11D, 12D, and 13D denote F (deceleration force margin, first threshold value, and second threshold value), those in FIGS. 8E, 9E, 10E, 11E, 12E, and 13E denote TVO (throttle valve opening angle and the shift position) in degrees and SHIFT, and lateral axes in FIGS. 8A through 13E denote distance in meters.

It is also noted that although, in the second embodiment, the third threshold value (SG3) is fixed as appreciated from FIG. 14, a hysteresis may be provided for the third threshold value.

What is claimed is:

1. A system for an automotive vehicle equipped with the system and defined as a system vehicle, comprising:

a first detector for detecting an inter-vehicle distance from the system vehicle to a preceding vehicle traveling ahead of the system vehicle;

a second detector for detecting a velocity of the system vehicle;

an inter-vehicle distance controller for calculating a target value of the velocity of the system vehicle to make a detected value of the inter-vehicle distance coincident with the target value of the inter-vehicle distance;

a system vehicle velocity controller for calculating a target value of a driving-and-braking force applied to the system vehicle to make a detected value of the system vehicle velocity coincident with the target value of the velocity of the system vehicle;

a drive controller for drivingly controlling a prime mover of the system vehicle and a transmission thereof in accordance with the target value of the driving-and-braking force;

a maximum deceleration force estimator for estimating a maximum deceleration force according to the target value of the velocity of the system vehicle and a shift position of the transmission of the system vehicle;

a relative velocity calculator for calculating a relative velocity of the system vehicle to the preceding vehicle on the basis of the detected value of the inter-vehicle distance; and a shift position determinator for determining the shift position of the transmission on the basis of the target value of the driving-and-braking force, the estimated maximum deceleration force, and the relative velocity.

2. A system for an automotive vehicle equipped with the system and defined as a system vehicle as claimed in claim 1, wherein the shift position determinator comprises a deceleration force margin calculator for calculating a deceleration force margin on the basis of the target value of the driving-and-braking force and the estimated maximum deceleration force and wherein the shift position determinator determines the shift position of the transmission of the system vehicle on the basis of the calculated deceleration force margin and the calculated relative velocity of the system vehicle to the preceding vehicle.

3. A system for an automotive vehicle equipped with the system and defined as a system vehicle as claimed in claim 2, wherein the shift position determinator determines a down-shift from a higher speed range to a lower speed range when the deceleration force margin is equal to or below a first threshold value and the relative velocity of the system vehicle to the preceding vehicle is equal to or below zero so as to approach to the preceding vehicle.

4. A system for an automotive vehicle equipped with the system and defined as a system vehicle as claimed in claim 3, wherein the shift position determinator determines a up-shift from the lower speed range to the higher speed range when the deceleration force margin is equal to or above a second threshold value or when the relative velocity of the system vehicle to the preceding vehicle is above zero so as to become far away from the preceding vehicle.

5. A system for an automotive vehicle equipped with the system and defined as a system vehicle as claimed in claim 3, wherein the shift position determinator modifies the first threshold value according to the relative velocity of the system vehicle to the preceding vehicle.

6. A system for an automotive vehicle equipped with the system and defined as a system vehicle as claimed in claim 5, wherein the shift position determinator enlarges the first threshold value as the relative velocity of the system vehicle to the preceding vehicle indicates such a value as approaching of the system vehicle to the preceding vehicle.

7. A system for an automotive vehicle equipped with the system and defined as a system vehicle as claimed in claim 3, which further comprises a third detector for detecting whether another vehicle is interrupted in the inter-vehicle distance between the system vehicle and the preceding vehicle and wherein, when the third detector detects that the other vehicle is interrupted in the inter-vehicle distance between the system vehicle and the preceding vehicle, the shift position determinator modifies the first threshold value according to a new inter-vehicle distance between the system vehicle and the other vehicle interrupted in the inter-vehicle distance between the system vehicle and the preceding vehicle.

8. A system for an automotive vehicle equipped with the system vehicle and defined as a system vehicle as claimed in claim 7, wherein the shift position determinator enlarges the first threshold value as the new inter-vehicle distance of the system vehicle to the other vehicle interrupted in the inter-vehicle distance between the system vehicle and the preceding vehicle becomes short.

9. A system for an automotive vehicle equipped with the system and defined as a system vehicle as claimed in claim 3, wherein the shift position determinator returns the modified first threshold value to its original value when the down-shift of the transmission is completed with a down-shift condition satisfied after the shift position determinator modifies the first threshold value.

10. A system for an automotive vehicle equipped with the system and defined as a system vehicle as claimed in claim 3, wherein the inter-vehicle distance controller includes a deviation calculator for calculating a deviation between the detected value of the inter-vehicle distance and the target value of the inter-vehicle distance, wherein the shift position determinator includes: a deviation determinator for determining whether the calculated deviation is equal to or below a predetermined deviation value; and a timer for measuring a time duration during which the deviation which is equal to or below the predetermined deviation value is continued, and wherein the shift position determinator returns the modified first threshold value to its original value when the time duration measured by the timer indicates a predetermined period of time.

11. A system for an automotive vehicle equipped with the system and defined as a system vehicle as claimed in claim 3, wherein the system velocity controller includes a deviation calculator for calculating a deviation between the detected value of the velocity of the system vehicle and the target value of the velocity of the system vehicle, wherein the shift position determinator includes: a deviation determinator for determining whether the calculated deviation is equal to or below a predetermined deviation value; and a timer for measuring a time duration during which the deviation which is equal to or below the predetermined deviation value is continued, and wherein the shift position determinator returns the modified first threshold value to its original value when the time duration measured by the timer indicates a predetermined period of time.

12. A system for an automotive vehicle equipped with the system and defined as a system vehicle as claimed in claim 1, which further comprises: a road surface gradient estimator for estimating a gradient of a road surface on which the system vehicle is running together with the preceding vehicle; a gradient determinator for determining whether the gradient of the road surface is equal to or negatively above a predetermined gradient value; and an up-shift inhibitor for inhibiting an up-shift of the transmission from a lower speed range to a higher speed range when the gradient determinator determines that the gradient of the road surface is equal to or negatively above the predetermined gradient value.

13. A system for an automotive vehicle equipped with the system and defined as a system vehicle as claimed in claim 12, wherein the system vehicle velocity controller further includes a disturbance compensator for estimating a disturbance applied to the system vehicle during a run of the system vehicle and compensating the driving-and-braking force of the system vehicle according to an estimated value of the disturbance and wherein the road gradient estimator estimates the road surface gradient on the basis of the estimated value of the disturbance.

14. A system for an automotive vehicle equipped with the system and defined as a system vehicle as claimed in claim 13, wherein the shift position determinator comprises a deceleration force margin calculator for calculating a deceleration force margin on the basis of the target value of the driving-and-braking force and the estimated deceleration force and wherein the shift position determinator determines the shift position of the transmission of the system vehicle on the basis of the calculated deceleration force margin and the calculated relative velocity of the system vehicle to the preceding vehicle.

15. A system for an automotive vehicle equipped with the system and defined as a system vehicle as claimed in claim 14, wherein the transmission of the system vehicle is an automatic transmission and wherein the shift position determinator includes: a present shift position determinator for determining whether a present shift position of the automatic transmission is placed at a fourth speed range or at a third speed range; a first deceleration force margin determinator for determining whether the deceleration force margin is equal to or negatively above a first threshold value (SG1) when the present shift position determinator determines that the present shift position of the automatic transmission is placed at the fourth speed range; a second deceleration force determinator for determining whether the deceleration force margin is equal to or positively above a second threshold value (SG2) when the present shift position determinator determines that the present shift position of the automatic transmission is placed at the third speed range; a first relative velocity determinator for determining whether the relative velocity of the system vehicle to the preceding vehicle is equal to or negatively below zero when the first deceleration force margin determinator determines that the deceleration force margin is equal to or negatively below the first threshold value (SG1); and a second relative velocity determinator for determining whether the relative velocity of the system vehicle to the preceding vehicle is above zero when the second deceleration force margin determinator determines that the deceleration force margin is equal to or positively above the second threshold value (SG2) and wherein the road surface gradient estimator includes an estimated disturbance determinator for determining whether the estimate value of the disturbance is equal to or above a third threshold value (SG3) when the second relative velocity determinator determines that the relative velocity of the system vehicle to the preceding vehicle is above zero with the deceleration force margin being equal to or positively above the second threshold value (SG2).

16. A system for an automotive vehicle equipped with the system and defined as a system vehicle as claimed in claim 15, wherein the up-shift inhibitor inhibits the up-shift of the automatic transmission from the third speed range to the fourth speed range when the estimated value of the disturbance is equal to or negatively above the third threshold value (SG3).

17. A system for an automotive vehicle equipped with the system and defined as a system vehicle as claimed in claim 16, wherein the first threshold value (SG1) is smaller than the second threshold value (SG2) (SG1<SG2) so that a hysteresis is provided for the threshold values to determine a shift of the present shift position from the fourth speed range to the third speed range and vice versa.

18. A system for an automotive vehicle equipped with the system and defined as a system vehicle as claimed in claim 17, wherein the up-shift inhibitor inhibits the up-shift from the third speed range to the fourth speed range when the second deceleration force margin determinator determines that the deceleration force margin is negatively below the second threshold value (SG2).

19. A system for an automotive vehicle equipped with the system and defined as a system vehicle as claimed in claim 18, wherein the up-shift inhibitor inhibits the up-shift of the automatic transmission from the third speed range to the fourth speed range when the second deceleration force margin determinator determines that the deceleration force is equal to or positively above the second threshold value (SG2) and the second relative velocity determinator determines that the relative velocity is equal to or negatively below zero.

20. A method for an automotive vehicle equipped with the method and defined as a system vehicle, the method comprising the steps of:

detecting an inter-vehicle distance from the system vehicle to a preceding vehicle traveling ahead of the system vehicle;

detecting a velocity of the system vehicle;

calculating a target value of the velocity of the system vehicle to make a detected value of the inter-vehicle distance coincident with the target value of the inter-vehicle distance;

calculating a target value of a driving-and-braking force applied to the system vehicle to make a detected value of the system vehicle velocity coincident with the target value of the velocity of the system vehicle;

drivingly controlling a prime mover of the system vehicle and a transmission thereof in accordance with the target value of the driving-and-braking force;

estimating a maximum deceleration force according to the target value of the velocity of the system vehicle and a shift position of the transmission of the system vehicle;

calculating a relative velocity of the system vehicle to the preceding vehicle on the basis of the detected value of the inter-vehicle distance; and determining the shift position of the transmission on the basis of the target value of the driving-and-braking force, the estimated maximum deceleration force, and the relative velocity.

* * * * *